(12) United States Patent
Tanaka et al.

(10) Patent No.: US 11,097,331 B2
(45) Date of Patent: Aug. 24, 2021

(54) PRESS-FORMED ARTICLE, PRESS-FORMING METHOD, AND PRESS-FORMING APPARATUS

(71) Applicant: NIPPON STEEL & SUMITOMO METAL CORPORATION, Tokyo (JP)

(72) Inventors: Yasuharu Tanaka, Nagoya (JP); Misao Ogawa, Tokai (JP); Takashi Miyagi, Nagoya (JP); Toshimitsu Aso, Tokai (JP); Hiroyuki Tanoue, Nagoya (JP); Ryo Kuroda, Nagoya (JP)

(73) Assignee: NIPPON STEEL CORPORATION, Tokyo (JP)

( * ) Notice: Subject to any disclaimer, the term of this patent is extended or adjusted under 35 U.S.C. 154(b) by 331 days.

(21) Appl. No.: 15/576,187

(22) PCT Filed: Jun. 1, 2016

(86) PCT No.: PCT/JP2016/066238
§ 371 (c)(1),
(2) Date: Nov. 21, 2017

(87) PCT Pub. No.: WO2016/194963
PCT Pub. Date: Dec. 8, 2016

(65) Prior Publication Data
US 2018/0133778 A1 May 17, 2018

(30) Foreign Application Priority Data
Jun. 1, 2015 (JP) .............................. JP2015-111436

(51) Int. Cl.
*B21D 22/02* (2006.01)
*B21D 28/26* (2006.01)
(Continued)

(52) U.S. Cl.
CPC ............. *B21D 28/26* (2013.01); *B21D 22/02* (2013.01); *B21D 22/20* (2013.01); *B21D 22/26* (2013.01); *B21D 24/16* (2013.01); *B21D 53/88* (2013.01)

(58) Field of Classification Search
CPC ........ B21D 22/02; B21D 22/06; B21D 22/20; B21D 22/22; B21D 22/26; B21D 34/16; B21D 53/88; B21D 24/16; B21D 28/02
See application file for complete search history.

(56) References Cited

U.S. PATENT DOCUMENTS

2010/0186475 A1  7/2010  Hirotani
2011/0095567 A1  4/2011  Ishigame et al.
(Continued)

FOREIGN PATENT DOCUMENTS

CN  1706572 A   12/2005
CN  101786122 A  7/2010
(Continued)

OTHER PUBLICATIONS

Chinese Office Action and Search Report, dated Sep. 21, 2018 for corresponding Chinese Application No. 201680030917.3, with an English translation of the Chinese Search Report.
(Continued)

*Primary Examiner* — Debra M Sullivan
(74) *Attorney, Agent, or Firm* — Birch, Stewart, Kolasch & Birch, LLP

(57) ABSTRACT

This press-formed article includes: a top sheet portion; a sidewall continuing to the top sheet portion via a convex ridge line portion; a flange continuing to the sidewall via a concaved ridge line portion; and an outward flange continuing from an edge portion of the top sheet portion to an edge portion of the flange, via an edge portion of the convex ridge line portion, an edge portion of the sidewall, and an edge
(Continued)

portion of the concaved ridge line portion, wherein in the same unit, an average thickness $T_{Ave}$, a minimum thickness $T_{Min}$, and a maximum thickness $T_{Max}$ of the outward flange satisfy Equation 1 and Equation 2.

$$0.8 \times T_{Ave} \leq T_{Min} < T_{Ave} \quad \text{(Equation 1)}$$

$$T_{Ave} < T_{Max} \leq 1.2 \times T_{Ave} \quad \text{(Equation 2)}.$$

3 Claims, 31 Drawing Sheets

(51) Int. Cl.
  *B21D 24/16* (2006.01)
  *B21D 22/20* (2006.01)
  *B21D 22/26* (2006.01)
  *B21D 53/88* (2006.01)

(56) References Cited

U.S. PATENT DOCUMENTS

| | | |
|---|---|---|
| 2012/0297853 A1 | 11/2012 | Tanaka et al. |
| 2013/0213109 A1 | 8/2013 | Ogasawara |
| 2015/0174634 A1 | 6/2015 | Nishimura et al. |
| 2015/0224563 A1 | 8/2015 | Aso et al. |
| 2015/0273563 A1 | 10/2015 | Miyagi et al. |
| 2015/0367392 A1 | 12/2015 | Nishimura et al. |
| 2016/0193644 A1 | 7/2016 | Nakazawa et al. |
| 2016/0199897 A1 | 7/2016 | Otsuka et al. |
| 2016/0200363 A1 | 7/2016 | Ito et al. |
| 2016/0279692 A1 | 9/2016 | Ito et al. |

FOREIGN PATENT DOCUMENTS

| | | |
|---|---|---|
| CN | 102050150 A | 5/2011 |
| CN | 102791396 A | 11/2012 |
| CN | 103286185 A | 9/2013 |
| CN | 104364030 A | 2/2015 |
| CN | 104582870 A | 4/2015 |
| JP | 2009-255116 A | 11/2009 |
| JP | 4438468 B2 | 3/2010 |
| JP | 2012-51005 A | 3/2012 |
| JP | 5569661 B2 | 8/2014 |
| JP | 2015-74354 A | 4/2015 |
| JP | 2015-81036 A | 4/2015 |
| RU | 2057606 C1 | 4/1996 |
| SD | 776712 A1 | 11/1980 |
| SU | 776712 A1 | 11/1980 |
| TW | 201422332 A | 6/2014 |
| WO | WO 2014/148618 A1 | 9/2014 |
| WO | WO 2015/040969 A1 | 3/2015 |
| WO | WO 2015/041009 A1 | 3/2015 |
| WO | WO 2015/053035 A1 | 4/2015 |
| WO | WO 2015/053036 A1 | 4/2015 |

OTHER PUBLICATIONS

Japanese Notice of Reasons for Rejection dated Aug. 20, 2019, for counterpart Japanese Application No. 2017-521975, with English translation.
Russian Office Action and Search Report, dated Oct. 26, 2018, for counterpart Russian Application No. 2017142960, along with an English translation.
International Search Report for PCT/JP2016/066238 dated Aug. 30, 2016.
Office Action for TW 105117236 dated Jul. 6, 2017.
Written Opinion of the International Searching Authority for PCT/JP2016/066238 (PCT/ISA/237) dated Aug. 30, 2016.
Extended European Search Report dated Feb. 5, 2019, for Counterpart European Application No. 16803397.5.

PRESS-FORMED ARTICLE, PRESS-FORMING METHOD, AND PRESS-FORMING APPARATUS

TECHNICAL FIELD

The present invention relates to a press-formed article excellent in rigidity and strength, which is suitably used for automotive body reinforcement member, and relates to a press-forming method and a press-forming apparatus.

The present invention claims priority on Japanese Patent Application No. 2015-111436, filed in Japan, on Jun. 1, 2015, which is incorporated herein by reference.

BACKGROUND ART

A floor of an automobile vehicle body (hereinafter, simply referred to as "floor") is not only primary responsible for torsional rigidity and bending rigidity of the vehicle body when the vehicle travels, but also responsible for transfer of an impact load when a crash occurs, and further, it exerts a large influence on the weight of the automobile vehicle body. Accordingly, for the floor, it is necessary to have antinomy characteristics of high rigidity and light weight.

The floor includes planar panels (for example, a dash panel, a front floor panel, a rear floor panel, and so on) which are welded to be jointed with each other, long cross members (for example, a floor cross member, a seat cross member, and so on) having approximately hat-shaped cross sections which are fixed to be disposed in the vehicle width direction of these planar panels by welding to enhance the rigidity and the strength of the floor, and long members (a side sill, a side member, and so on) having approximately hat-shaped cross sections which are fixed to be disposed in the forward and rearward direction of vehicle body to enhance the rigidity and the strength of the floor. Out of the above, the cross members are normally jointed to other members such as, for example, a tunnel part of the front floor panel and the side sill by using outward flanges formed at both end parts in the longitudinal direction thereof as joint margins.

FIG. 28A to FIG. 28D are explanatory views showing a floor cross member 1, which is a representative example of the cross member joined to the other member using the outward flange formed on the both ends in the longitudinal direction as the joint margin. FIG. 28A is a perspective view thereof, FIG. 28B is an A-arrow view of FIG. 28A, FIG. 28C is a B-arrow view of FIG. 28A, and FIG. 28D is an explanatory view enlarging a round dashed line circle section in FIG. 28B.

For example, a front floor panel 2 is generally reinforced by the front cross member 1 which joins a tunnel part (illustration is omitted) joined to an upper surface (a surface at an interior side) of the front floor panel 2 and formed so as to protrude at approximately the center in the width direction of the front floor panel 2, and side sills 3 spot-welded at both side parts in the width direction of the front floor panel 2.

The floor cross member 1 is jointed to the tunnel part and the side sills 3 by the spot welding or the like by using outward flanges 4 formed at both end parts in the longitudinal direction thereof as joint margins, thereby improving the rigidity of the floor 2 and the load transfer characteristic when an impact load is applied.

FIG. 29 is an explanatory view showing an outline of a conventional press-forming method of the floor cross member 1, and particularly enlarging a region of the end portion of the floor cross member 1 in the longitudinal direction. In FIG. 29, (a) shows a case where press forming is performed by drawing, and (b) shows a case where, using an expanded blank 6, press forming is performed by bending.

In FIG. 29, (a) shows an example of a press-forming method including steps of: forming an excessive material volume part 5a on the forming material 5 by performing press forming by drawing; removing the excessive material volume part 5a along a cutting line 5b; and thereafter raising the flange 5c.

In FIG. 29, (b) shows an example of a press-forming method in which an expanded blank 6 having an expanded blank shape is press formed by bending.

Note that from the point of view of the improvement of the material yield, the press forming by bending is more preferable than the press forming by drawing which involves the cutting of the excessive material volume part 5a.

The press forming by drawing as shown in (a) in FIG. 29 will be supplementary explained.

FIG. 30 is a perspective view showing a manufacturing apparatus 7 performing a press forming by drawing as shown in (a) in FIG. 29.

(a) in FIG. 31 is a perspective view showing the manufacturing apparatus 7 before forming, (b) in FIG. 31 is a cross sectional view showing the manufacturing apparatus 7 before forming, and (c) in FIG. 31 is a perspective view of the blank 8 picked up before forming.

(d) in FIG. 31 is a perspective view showing the manufacturing apparatus 7 during forming, (e) in FIG. 31 is a cross sectional view of the manufacturing apparatus 7 during forming, and (f) in FIG. 31 is a perspective view showing the blank 8 picked up during forming.

(g) in FIG. 31 is a perspective view showing the manufacturing apparatus 7 after forming, (h) in FIG. 31 is a cross sectional view showing the manufacturing apparatus 7 after forming, and (i) in FIG. 31 is a perspective view showing a press-formed article (forming material 5).

The manufacturing device 7 includes a punch 7-1, a blank holder 7-2, and a die 7-4 which supports a die pad which is not shown in the drawings. The blank holder 7-2 and the die pad clamps a pre-formed blank 8, and the punch 7-1 and the die 7-4 are relatively approached each other while holding the blank holder 7-2 and the die 7-4, whereby the press working by drawing is performed on the blank 8. As a result, a forming material 5 with an excessive material volume part 5a is formed.

The floor cross member 1 is an important structural member which is responsible for the rigidity improvement of the automobile vehicle body and transfer of the impact load at a time of side surface crash (side impact). Accordingly, in recent years, a thinner and higher-tensile strength steel sheet, for example, a high-tensile strength steel sheet with a tensile strength of 390 MPa or more (a high-tensile strength steel sheet so called "high-ten") has been used as a material of the floor cross member 1, from the point of view of reduction in the weight and improvement in crash safety. However, formability of the high-tensile strength steel sheet is not good, and therefore, it is a problem that a flexibility of design of the floor cross member 1 is low. This will be specifically described with reference to FIG. 28A to FIG. 28D.

It is desirable that the outward flange 4 at the end part in the longitudinal direction of the floor cross member 1 is continuously formed so as to have a certain degree of flange width including a curving section 4a as indicated by a dotted line in FIG. 28D, in order to enhance the jointing strength between the floor cross member 1 and the tunnel part of the front floor panel 2 and the side sills 3, and to enhance the rigidity of the floor 2 and the load transfer characteristic when the impact load is applied.

However, when the continuous flange having the curving section 4a of the outward flange 4 is tried to be formed through cold press forming, and the certain degree of flange width is tried to be obtained, basically, the following failures of:

(i) stretch flange fractures at a sheet end portion of the curving section 4a of the outward flange 4; and (ii) wrinkling at an end portion 1b in the longitudinal direction of a convex ridge line portion 1a of the floor cross member 1 and at a position from a center portion to a vicinity of a root of the curving section 4a of the outward flange 4, are occurred, which makes it difficult to obtain a desired shape.

These forming failures are easy to occur as a strength of steel material used for the floor cross member 1 is higher, and in a shape with higher stretch flange rate at the forming of the curving section 4a of the outward flange 4 (namely, as a cross sectional wall angle θ in FIG. 28B and FIG. 28C is steeper).

The floor cross member 1 tends to be high-strengthened to reduce the weight of the automobile vehicle body. Accordingly, the cold forming of the continuous outward flange 4 including the curving section 4a tends to be difficult to be enabled by the conventional press-forming method. Accordingly, even if lowering of the rigidity in the vicinity of the joint part of the floor cross member 1 with the other member and the load transfer characteristic is accepted, due to restrictions on the press forming technology as stated above, it is the present situation in which the occurrence of forming failures has to be avoided by providing, to the curving sections 4a of the outward flange 4 of the floor cross member 1 made of the high-tensile strength steel sheet, cutouts each of which is deep to some extent that it reaches the end portion 1b in the longitudinal direction of the convex ridge line portion 1a, as illustrated in FIG. 28A and FIG. 28B.

Patent Documents 1 to 3 are not directed to a forming of the floor cross member 1, but disclose inventions to solve a problem of failure due to the shape fixability in the press-formed member made of the high-tensile material, by devising a pad of a forming tool. In these inventions, the shape fixability after the forming is improved by intentionally generating a deflection at the blank during forming by adjusting the positional relationship between the punch top portion and a flat pad which only faces to the flat portion of the punch portion.

Further, Patent Document 4 discloses a technology for press forming a member such as a floor cross member by bending or drawing.

PRIOR ART DOCUMENTS

Patent Documents

[Patent Document 1] Japanese Patent Publication No. 4,438,468

[Patent Document 2] Japanese Unexamined Patent Application, First Publication No. 2009-255116

[Patent Document 3] Japanese Unexamined Patent Application, First Publication No. 2012-051005

[Patent Document 4] Japanese Patent Publication No. 5,569,661

DISCLOSURE OF THE INVENTION

Problems to be Solved by the Invention

According to the results of the inventors' research, even based on the conventional inventions disclosed in the Patent Documents 1 to 3, it was difficult to press form a floor cross member 1 which is a press-formed member made from a high-tensile steel sheet and formed with an outward flange 4 at least from a top sheet portion to a convex ridge line portion at an end portion in the longitudinal direction, without providing a cutout at a curving section 4a of the outward flange 4 to a depth that enters the end portion 1b of the convex ridge line portion 1a in the longitudinal direction.

Further, in the conventional invention disclosed in the Patent Document 4, as a portion corresponding to the outward flange 4 is formed by bending or drawing, it is necessary to provide a cutout for preventing a stretch flange fracture and the wrinkles from being occurred at this portion, as a result, countermeasures for increasing the rigidity at a portion in the vicinity of the cutout and the joint strength for joining another member.

An objective of the present invention is to provide a press-formed article such as a floor cross member without forming a cutout at the outward flange, and to provide a press-forming method and a press-forming apparatus for manufacturing the press-formed article.

Means for Solving the Problem

The gist of the present invention is as follows.

(1) A first aspect of the present invention is a press-formed article including: a top sheet portion; a sidewall continuing to the top sheet portion via a convex ridge line portion; a flange continuing to the sidewall via a concaved ridge line portion; and an outward flange continuing from an edge portion of the top sheet portion to an edge portion of the flange, via an edge portion of the convex ridge line portion, an edge portion of the sidewall, and an edge portion of the concaved ridge line portion, wherein in the same unit, an average thickness $T_{Ave}$, a minimum thickness $T_{Min}$, and a maximum thickness $T_{Max}$ of the outward flange satisfy Equation 1 and Equation 2.

$$0.8 \times T_{Ave} \leq T_{Min} < T_{Ave} \quad \text{(Equation 1)}$$

$$T_{Ave} < T_{Max} \leq 1.2 \times T_{Ave} \quad \text{(Equation 2)}.$$

(2) The press-formed article according to the above (1) may include a hat type cross section having a pair of the sidewalls and a pair of the flanges.

(3) In the press-formed article according to the above (1) or (2), a material may be a steel sheet with a tensile strength of not less than 390 MPa.

(4) In the press-formed article according to any one of the above (1) to (3), a minimum width of the outward flange may be not less than 12 mm.

(5) A second aspect of the present invention is a press-forming method including:

a shearing step that shears and deforms a workpiece in which a cross section perpendicular to a predetermined direction has a top sheet portion, a sidewall continuing to the top sheet portion via a convex ridge line portion, and a flange continuing to the sidewall via a concaved ridge line portion, at a middle position viewed along the predetermined direction, thereby forming a stepped portion continuing to all of the top sheet portion, the sidewall, and the flange.

(6) The press-forming method according to the above (5) may further include: a removing step in which an unnecessary portion near the stepped portion is removed after the shearing step, thereby forming an outward flange continuing from an edge portion of the top sheet portion to an edge portion of the flange, via an edge portion of the convex ridge line portion, an edge portion of the sidewall, and an edge portion of the concaved ridge line portion.

(7) In the press-forming method according to the above (5) or (6), in the shearing step, a first part in the workpiece may be restricted by a first punch and a first die, a second part in the workpiece may be restricted by a second punch and a second die, the first part and the second part in the workpiece being divided by the portion to be formed to the stepped portion, and the stepped portion may be formed by relatively moving a set of the first punch and the first die, and a set of the second punch and the second die in an oblique direction, in a state where a clearance from the workpiece is not created.

(8) In the press-forming method according to the above (7), an angle formed between the oblique direction and an extending direction of the top sheet portion in the cross section may be not less than 20 degrees, an angle formed between the oblique direction and an extending direction of the sidewall in the cross section may be not less than 20 degrees, and an angle formed between the oblique direction and an extending direction of the flange in the cross section may be not less than 20 degrees.

(9) A third aspect of the present invention is a press-forming apparatus that deforms a workpiece in which a cross section perpendicular to a predetermined direction includes a top sheet portion; a sidewall continuing to the top sheet portion via a convex ridge line portion; and a flange continuing to the sidewall via a concaved ridge line portion; so as to obtain a press-formed article having an outward flange continuing from an edge portion of the top sheet portion to an edge portion of the flange, via an edge portion of the convex ridge line portion, an edge portion of the sidewall, and an edge portion of the concaved ridge line portion, the press-forming apparatus including: a first punch and a first die that restrict a first part in the workpiece; a second punch and a second die that restrict a second part in the workpiece, the first part and the second part in the workpiece being divided at a middle position in the predetermined direction; and a driving unit that relatively moves a set of the first punch and the first die, and a set of the second punch and the second die in an oblique direction to form a stepped portion at the middle position, in a state where a clearance from the workpiece is not created.

(10) In the press-forming apparatus according to the above (9), an angle formed between the oblique direction and an extending direction of the top sheet portion in the cross section may be not less than 20 degrees, an angle formed between the oblique direction and an extending direction of the sidewall in the cross section may be not less than 20 degrees, and an angle formed between the oblique direction and an extending direction of the flange in the cross section may be not less than 20 degrees.

Effects of the Invention

According to the above press-formed article, by using the outward flange formed from the edge portion of the top sheet portion to the edge portion of the flanges, via the edge portion of the convex ridge line portion, the edge portion of the sidewall, and the edge portion of the concaved ridge line portion as a joint margin, the press-formed article can be joined to another member. Accordingly, it is possible to enhance the rigidity in the vicinity of the joint part of the press-formed article with the other member and the load transfer characteristic. Accordingly, if the press-formed article is for example used as a floor cross member, it is possible to improve the bending rigidity and the twisting rigidity of the body shell, which makes it possible to improve or increase the steering stability, the riding comfortableness, and the noise reduction of the automobile.

In addition, according to the press-forming method and the press-forming apparatus as described above, the stepped portion which becomes the outward flange can be formed by shearing deformation. Accordingly, without providing a cutout at the outward flange for preventing the stretch flange fracture and the wrinkles from being occurred, the above press-formed article can be successfully manufactured.

EMBODIMENTS OF THE INVENTION

Figure 1:
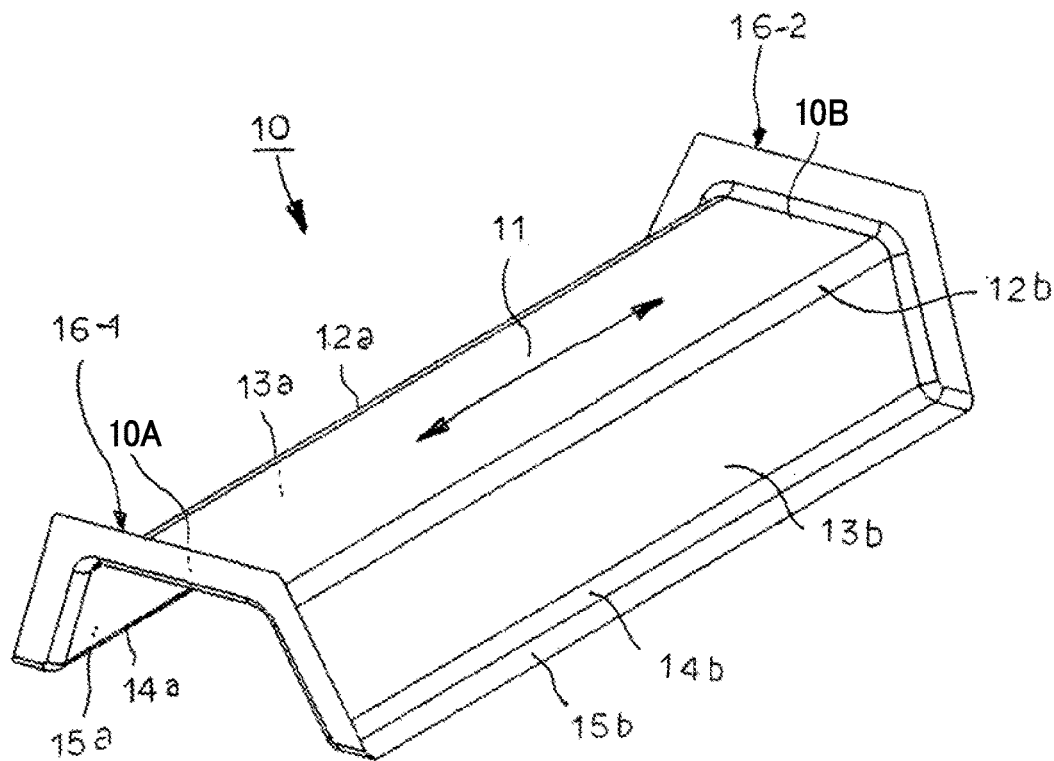
FIG. 1 is a perspective view showing a press-formed article according to an embodiment of the present invention.

As a result of the keen studying on the solution for the above problems, the inventors obtained the following findings (A) and (B), and accomplished the present invention through further investigations.

(A) It is possible to provide a desired press-formed article having an outward flange by:

performing a shearing deformation in the direction intersecting with the longitudinal direction at a middle position in the longitudinal direction of the press-formed body which has a cross section including a top sheet portion, a convex ridge line portion continuing to the top sheet portion, a sidewall continuing to the convex ridge line portion, a concaved ridge line portion continuing to the sidewall, and a flange continuing to the concaved ridge line portion, thereby forming a stepped portion continuing to the top sheet portion, the convex ridge line portion, the sidewall, the concaved ridge line portion, and the flange, and removing an unnecessary portion near the stepped portion.

(B) To form the above stepped portion in the press-formed body, a shearing deformation of the press-formed body may be performed at a portion to be formed to the stepped portion by:

restricting a first part in the blank by a first punch and a first die, and restricting a second part in the blank by the second punch and the second die, where the first part and the second part are divided by a portion to be formed to the stepped portion in the longitudinal direction of the press-formed body, and relatively moving a set of the first punch and the first die, and a set of the second punch and the second die in the oblique direction with respect to the top sheet portion of the press-formed body (workpiece), in a state where a clearance from the press-formed body is not created.

An embodiment 1 for enabling the present invention and embodiments 2 to 4 which are modifications of the embodiment 1 will be explained with reference to the drawings. It should be noted that in the explanations of the embodiments 2 to 4, a configuration different from the embodiment 1 will be explained, and for a configuration which is explained in the embodiment 1, the same reference number in the drawing is assigned to reduce redundant explanations.

(1) Embodiment 1

1. Press-Formed Article 10 According to the Present Embodiment

FIG. 1 is a perspective view showing a press-formed article 10 according to the present embodiment.

The press-formed article 10 shown in FIG. 1 is a press-formed article formed from a high-tensile strength steel sheet (sheet thickness: 0.6 to 3.5 mm) having a tensile strength of not less than 390 MPa, preferably not less than 590 MPa, and more preferably not less than 980 MPa.

The press-formed article 10 has a substantially hat type cross section including a top sheet portion 11, two convex ridge line portions 12a, 12b, two sidewalls 13a, 13b, and two concaved ridge line portions 14a, 14b, and two flanges 15a, 15b.

In this cross section, two convex ridge line portions 12a, 12b are both continuing to the top sheet portion 11. Each of the two sidewalls 13a, 13b continues to each of the two convex ridge line portions 12a, 12b. Each of the two concaved ridge line portions 14a, 14b continues to each of the two sidewalls 13a, 13b. In addition, each of the two flanges 15a, 15b continues to each of the two concaved ridge line portions 14, 14.

That is, the press-formed article 10 has a cross section including a top sheet portion 11, a convex ridge line portion 12a or 12b continuing to the top sheet portion 11, a sidewall 13a or 13b continuing to the convex ridge line portion 12a or 12b, a concaved ridge line portion 14a or 14b continuing to the sidewall 13a or 13b, and a flange 15a or 15b continuing to the concaved ridge line portion 14a or 14b.

The outward flanges 16-1, 16-2 are formed at both end portions 10A, 10B in the longitudinal direction (the directions indicated by an arrow shown in FIG. 1) of the press-formed article 10.

Each of the outward flanges 16-1, 16-2 are continuously formed at the edge portion from the first flange 15a to the second flange 15b, via the first concaved ridge line portion 14a, the first sidewall 13a, the first convex ridge line portion 12a, the top sheet portion 11, the second convex ridge line portion 12b, the second sidewall 13b, the second concaved ridge line portion 14b in this order.

The outward flanges 16-1, 16-2 satisfy the following Equation 1 and Equation 2 where, in the same unit (for example, mm), $T_{Ave}$ is the average thickness of the outward flange, $T_{Min}$ is the minimum thickness of the outward flange, and $T_{Max}$ is the maximum thickness of the outward flange.

$$0.8 \times T_{Ave} \leq T_{Min} < T_{Ave} \quad \text{(Equation 1)}$$

$$T_{Ave} < T_{Max} \leq 1.2 \times T_{Ave} \quad \text{(Equation 2).}$$

If the $T_{Min}$ is less than $0.8 \times T_{Ave}$, or the $T_{Max}$ is more than $1.2 \times T_{Ave}$, the deviation of the sheet thickness in the outward flange is large, therefore, the rigidity and the joint strength to another member may deteriorate at a portion where the sheet thickness is locally small.

The upper limit value of the $T_{Min}$ and the lower limit value of the $T_{Max}$ should not be particularly limited, thus, the upper limit of the $T_{Min}$ is less than $T_{Ave}$.

The minimum value $T_{Min}$, the maximum thickness $T_{Max}$, and the average thickness $T_{Ave}$ of the sheet thickness of the outward flanges 16-1, 16-2 are respectively calculated by measuring the thickness of 10 measuring points with at least 2 mm intervals, at a central position of the outward flanges 16-1, 16-2 in the flange width direction, for each of the outward flanges 16-1, 16-2.

In the above explanations, the outward flanges 16-1, 16-2 are formed at both end portions 10A, 10B in the longitudinal direction of the press-formed article 10 as an example; however, the present invention is not limited only thereto. Only one of the outward flanges 16-1 and 16-2 may be formed at the end portion 10A or 10B in the longitudinal direction of the press-formed article 10.

Further, in the above explanation, the outward flanges 16-1, 16-2 are continuously formed at the edge portion from the first flange 15a to the second flange 15b via the first concaved ridge line portion 14a, the first sidewall 13a, the first convex ridge line portion 12a, the top sheet portion 11, the second convex ridge line portion 12b, the second sidewall 13b, and the second concaved ridge line portion 14b in this order; however, the present invention is not limited only thereto. The outward flange 16-1 or 16-2 may be formed from the first flange 15a to the top sheet portion 11 via the first concaved ridge line portion 14a, the first sidewall 13a, and the first convex ridge line portion 12a in this order, or may be formed from the first flange 15b to the top sheet portion 11 via the second concaved ridge line portion 14b, the second sidewall 13b, and the second convex ridge line portion 12b in this order.

The press-formed article 10 is formed with the outward flanges 16-1, 16-2 extending from the top sheet portion 11 to the flanges 15a, 15b, for example in the hat type cross section, without providing a cutout which enters into the convex ridge line portions 12a, 12b or the concaved ridge line portions 14a, 14b at the curving section of the outward flanges 16-1, 16-2.

According to this press-formed article 10, by using the outward flanges 16-1, 16-2 formed at least from the top sheet portion 11 to the flanges 15a, 15b in the end portion in the longitudinal direction as a joint margin, it is possible to join this press-formed article 10 to another member (a tunnel portion of the front floor panel or a side sill inner panel, if the press-formed article 10 is a cross member), therefore, it is possible to significantly enhance the rigidity in the vicinity of the joint part of the press-formed article 10 with the other member and the load transfer characteristic, and further, the joint strength between the floor panel and the side sill. Therefore, for example if the press-formed article 10 is used as a floor cross member, it is possible to improve the bending rigidity and the twisting rigidity of the body shell, which makes it possible to improve or increase the steering stability, the riding comfortableness, and the noise reduction of the automobile.

It is preferable that the minimum width of the outward flanges 16-1, 16-2 be not less than 12 mm, so that the joint margin for joining the press-formed article with another member can be sufficiently secured.

The minimum width of the outward flanges 16-1, 16-2 is preferably not less than 15 mm and more preferably not less than 20 mm.

It should be noted that the outward flange width is a distance in the normal direction of the concaved ridge line portion, from the concaved ridge line portion to the end portion of the outward flange.

Figure 2A:
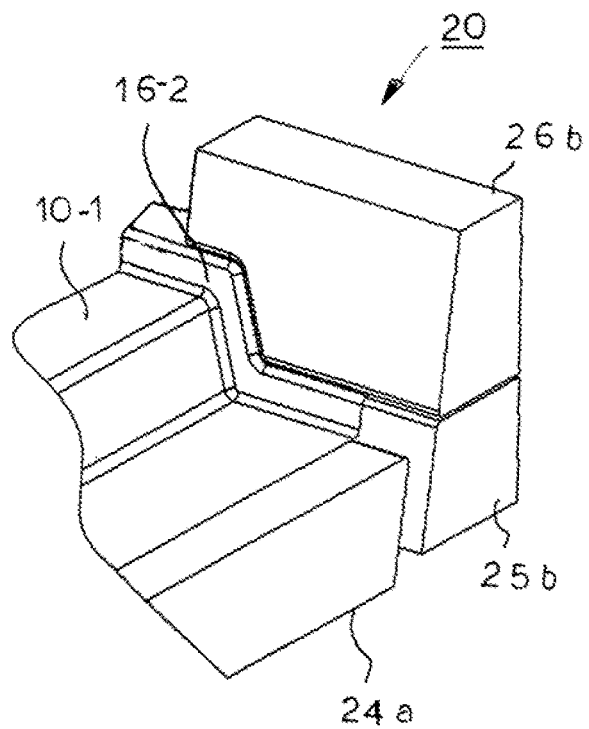
FIG. 2A is an explanation view showing an overview of a state where an intermediate formed article of the press-formed article is manufactured by using a press-forming apparatus according to an embodiment of the present invention, and is a perspective view showing a main part of the press-forming apparatus after forming a stepped portion which becomes an outward flange.
Figure 2B:
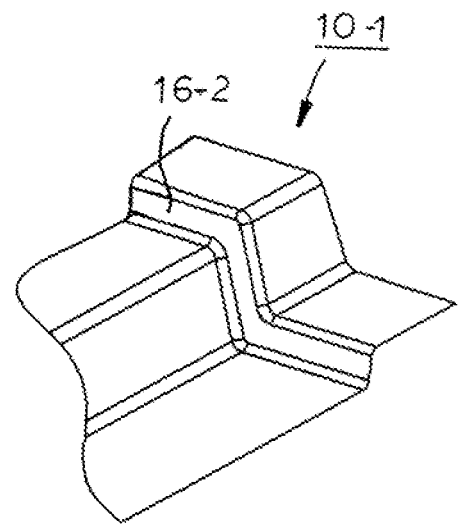
FIG. 2B is a perspective view showing a main part of the intermediate formed article formed with the stepped portion.
Figure 2C:
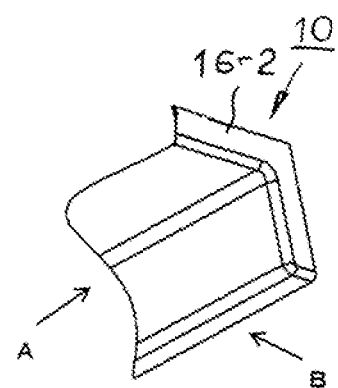
FIG. 2C is a perspective view showing an area in the vicinity of the outward flange of the press-formed article.
Figure 2D:
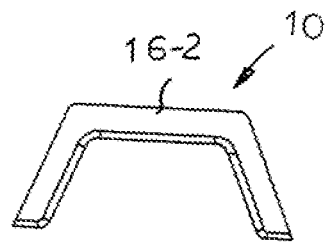
FIG. 2D is an A-arrow view in FIG. 2C.
Figure 2E:
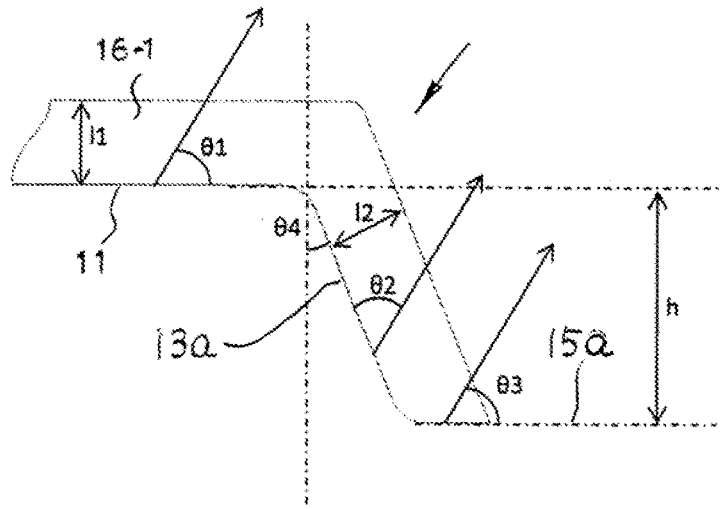
FIG. 2E is an explanatory view showing factors associated with the formability of the outward flange.
Figure 2F:
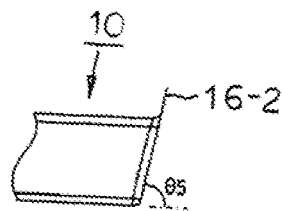
FIG. 2F is a B-arrow view in FIG. 2C.

2. Press-Forming Apparatus 20 and Press-Forming Method According to the Present Embodiment FIG. 2A to FIG. 2F are explanatory views showing an overview of a state where an intermediate formed article 10-1 of the press-formed article 10 is manufactured by using a press-forming apparatus 20 according to this embodiment. FIG. 2A is a perspective view showing a main part of the press-forming apparatus 20 after forming the stepped portion 16-2, which becomes the outward flange. FIG. 2B is a perspective view showing a main part of the intermediate formed article 10-1 formed with the stepped portion 16-2. FIG. 2C is a perspective view showing an area in the vicinity of the outward flange 16-2 of the press-formed article 10. FIG. 2D is an A-arrow view in FIG. 2C. FIG. 2E is an explanatory view showing factors associated with the formability of the outward flange 16-2. FIG. 2F is a B-arrow view in FIG. 2C.

Figure 3:
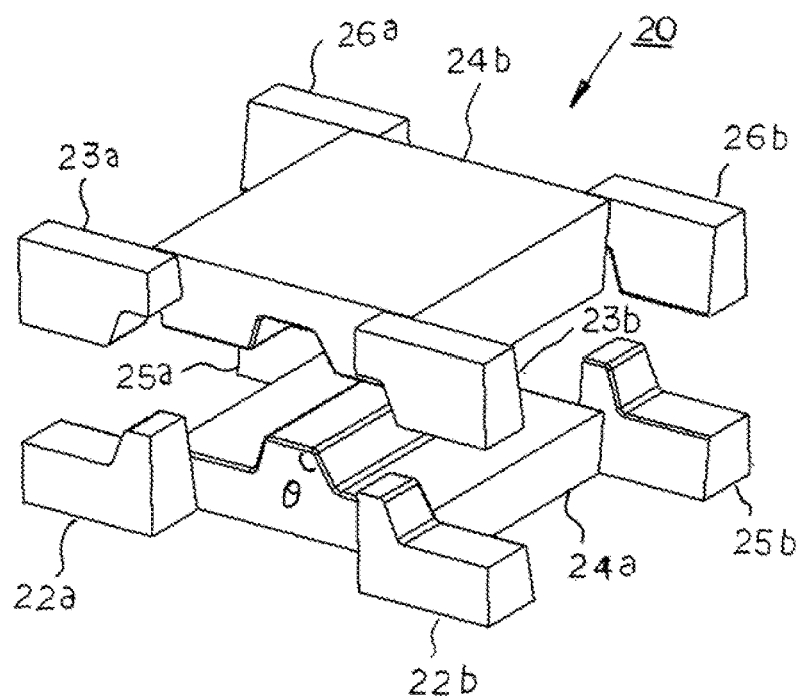
FIG. 3 is a perspective view showing members of the press-forming apparatus according to an embodiment of the present invention.

FIG. 3 is a perspective view showing members of the press-forming apparatus 20 according to this embodiment.

Figure 4:
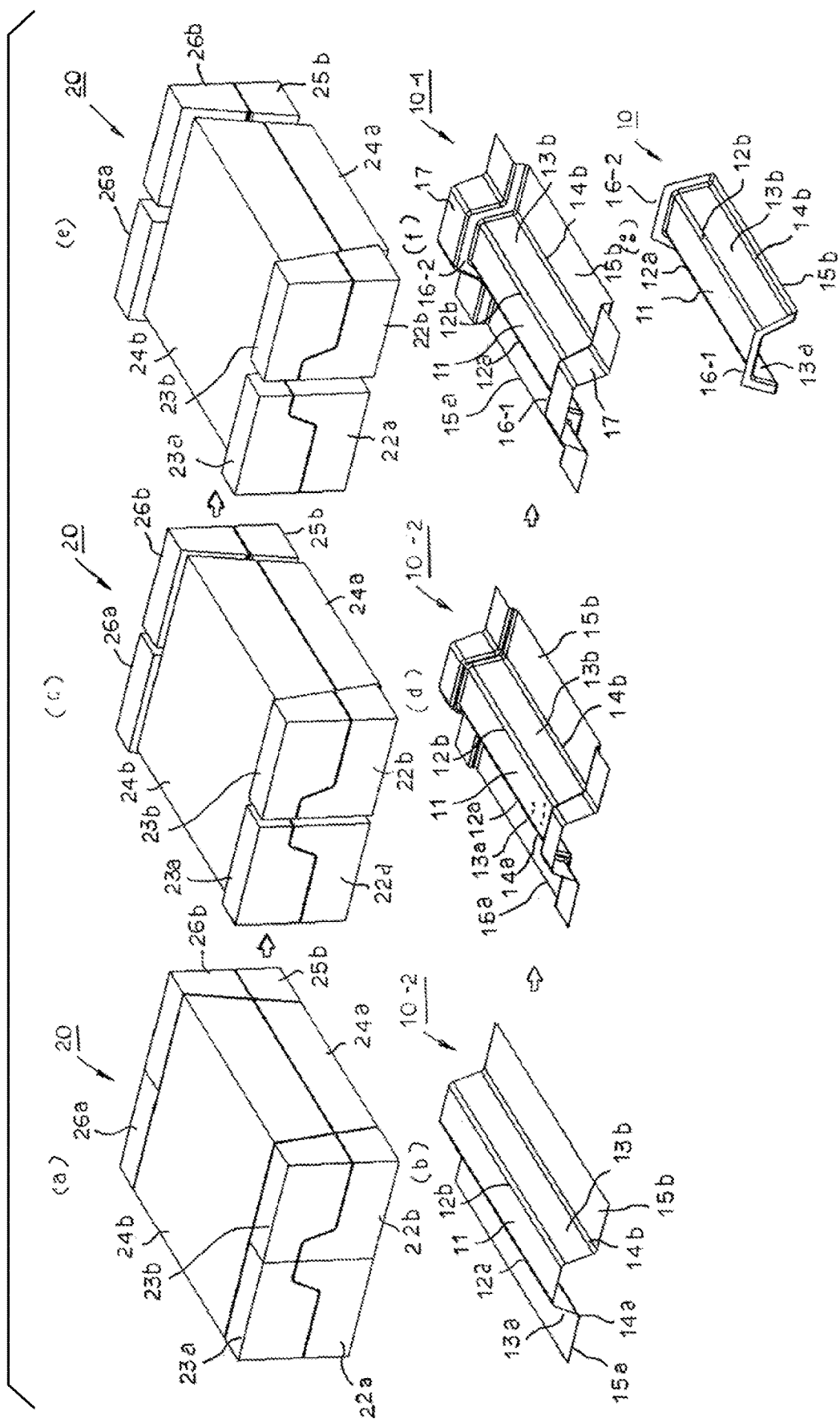
FIG. 4 is an explanatory view showing manufacturing of the intermediate formed article and the press-formed article by using the press-forming apparatus according to an embodiment of the present invention.

FIG. 4 is an explanatory view showing manufacturing of the intermediate formed article 10-1 and the press-formed article 10 by using the press-forming apparatus 20 according to this embodiment.

(a) is a perspective view showing the press-forming apparatus 20 before forming the stepped portions 16-1, 16-2 which become outward flanges, and (b) is a perspective view showing the blank 10-2 picked up therefrom.

(c) is a perspective view showing the press-forming apparatus 20 when the stepped portions 16-1, 16-2 are being formed, and (d) is a perspective view showing the blank 10-2.

(e) is a perspective view showing the press-forming apparatus 20 after forming the stepped portions 16-1, 16-2, and (f) is a perspective view showing the intermediate formed article 10-1.

(g) is a perspective view showing the press-formed article 10.

Figure 5:
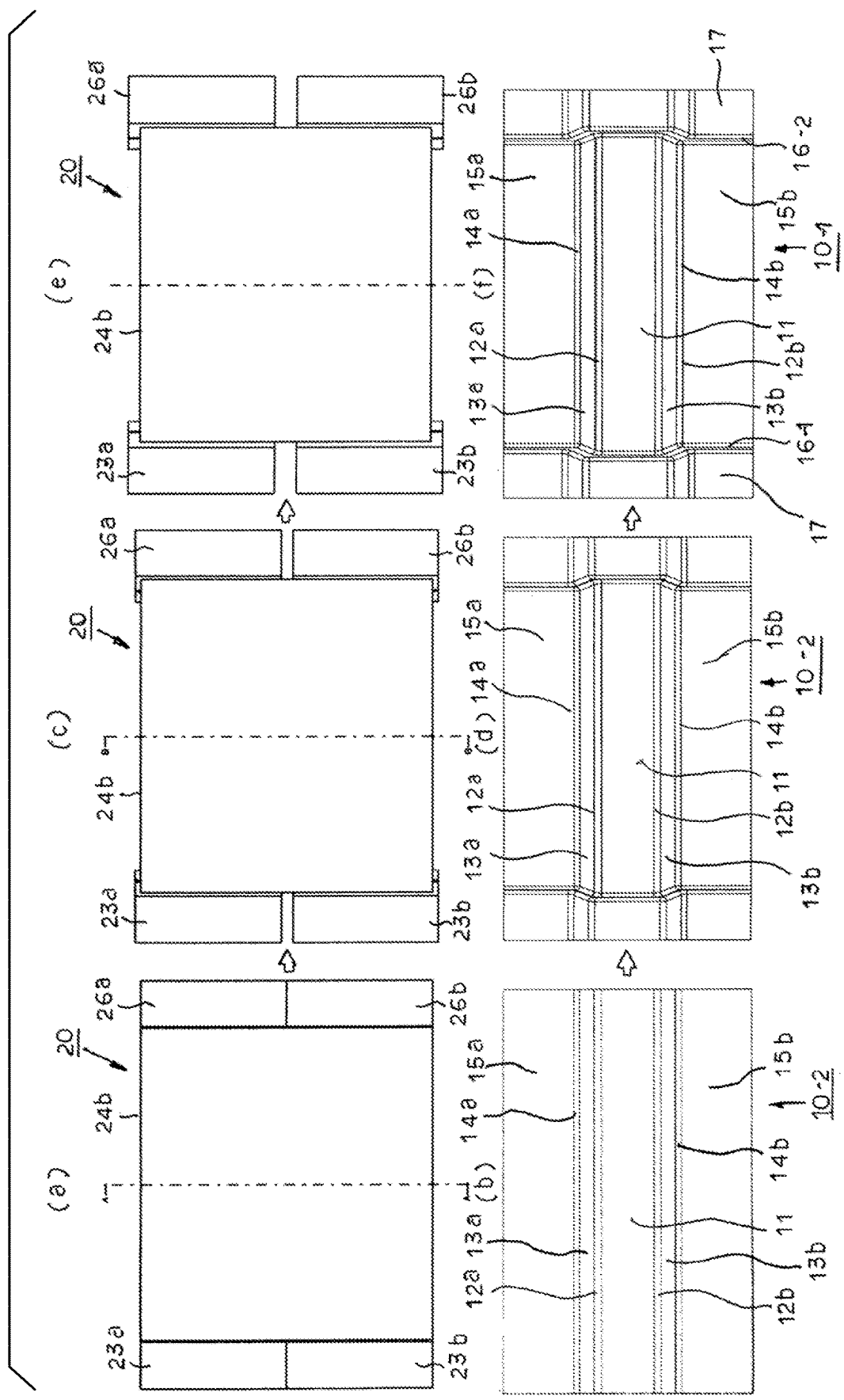
FIG. 5 is an explanatory view showing manufacturing of the intermediate formed article and the press-formed article by using the press-forming apparatus according to an embodiment of the present invention.

FIG. 5 is an explanatory view showing manufacturing of the intermediate formed article 10-1 and the press-formed article 10 by using the press-forming apparatus 20 according to this embodiment.

(a) is a top view showing the press-forming apparatus 20 before forming the stepped portions 16-1, 16-2 which become the outward flanges, and (b) is a top view of the blank 10-2 picked up therefrom.

(c) is a top view showing the press-forming apparatus 20 when the stepped portions 16-1, 16-2 are being formed, and (d) is a top view showing the blank 10-2.

(e) is a top view showing the press-forming apparatus 20 after the stepped portions 16-1, 16-2 are formed, and (f) is a top view showing the intermediate formed article 10-1.

Figure 6:
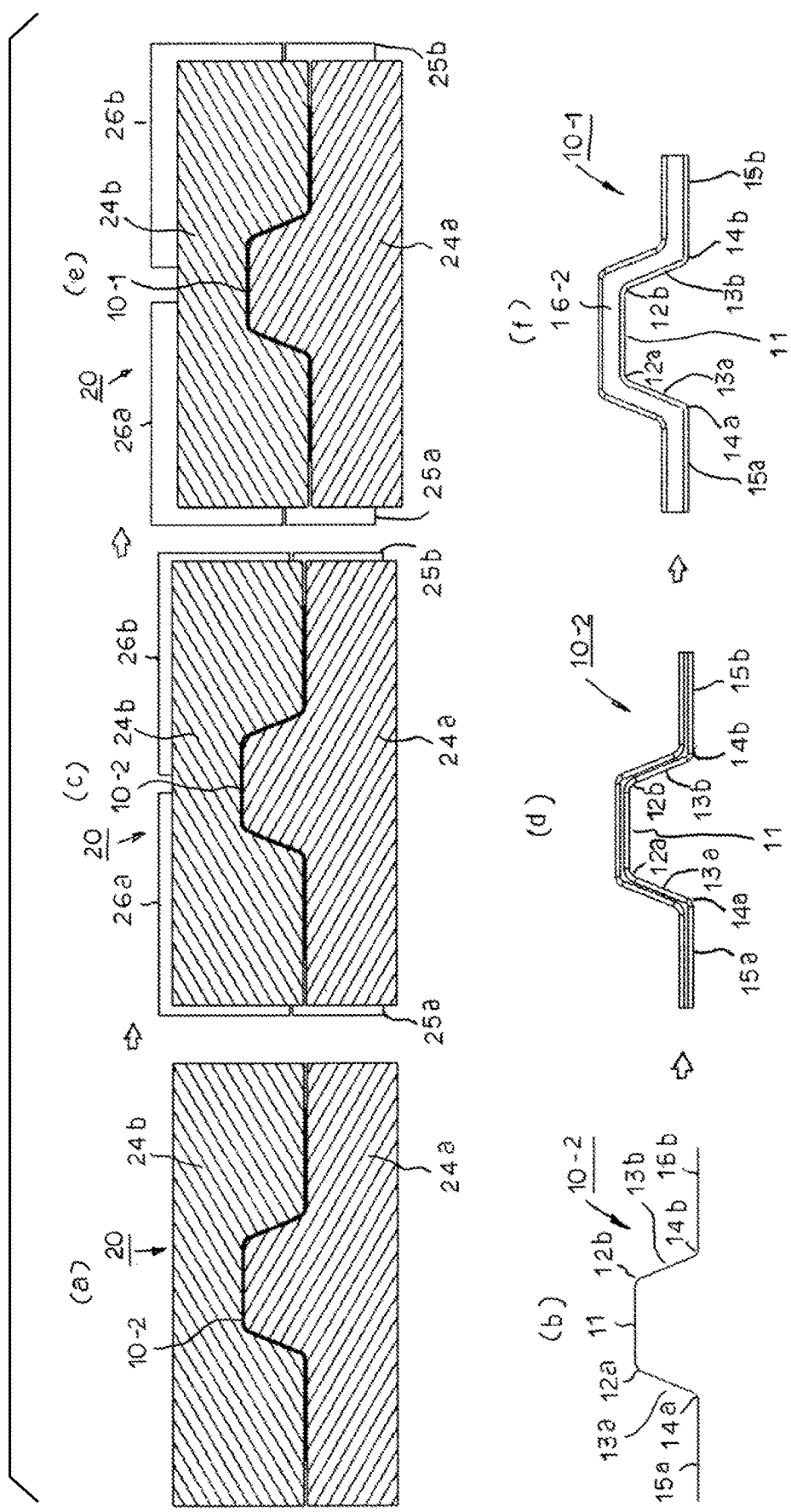
FIG. 6 is an explanatory view showing manufacturing of the intermediate formed article and the press-formed article by using the press-forming apparatus according to an embodiment of the present invention.

FIG. 6 is an explanatory view showing manufacturing of the intermediate formed article 10-1 and the press-formed article 10 by using the press-forming apparatus 20 according to this embodiment.

(a) is a front view showing the press-forming apparatus 20 before forming the stepped portions 16-1, 16-2 which becomes the outward flange, and (b) is a front view of the blank 10-2 picked up therefrom.

(c) is a front view showing the press-forming apparatus 20 when the stepped portions 16-1, 16-2 are being formed, and (d) is a front view showing the blank 10-2.

(e) is a front view showing the press-forming apparatus 20 after the stepped portions 16-1, 16-2 are formed, and (f) is a front view showing the intermediate formed article 10-1.

Figure 7:
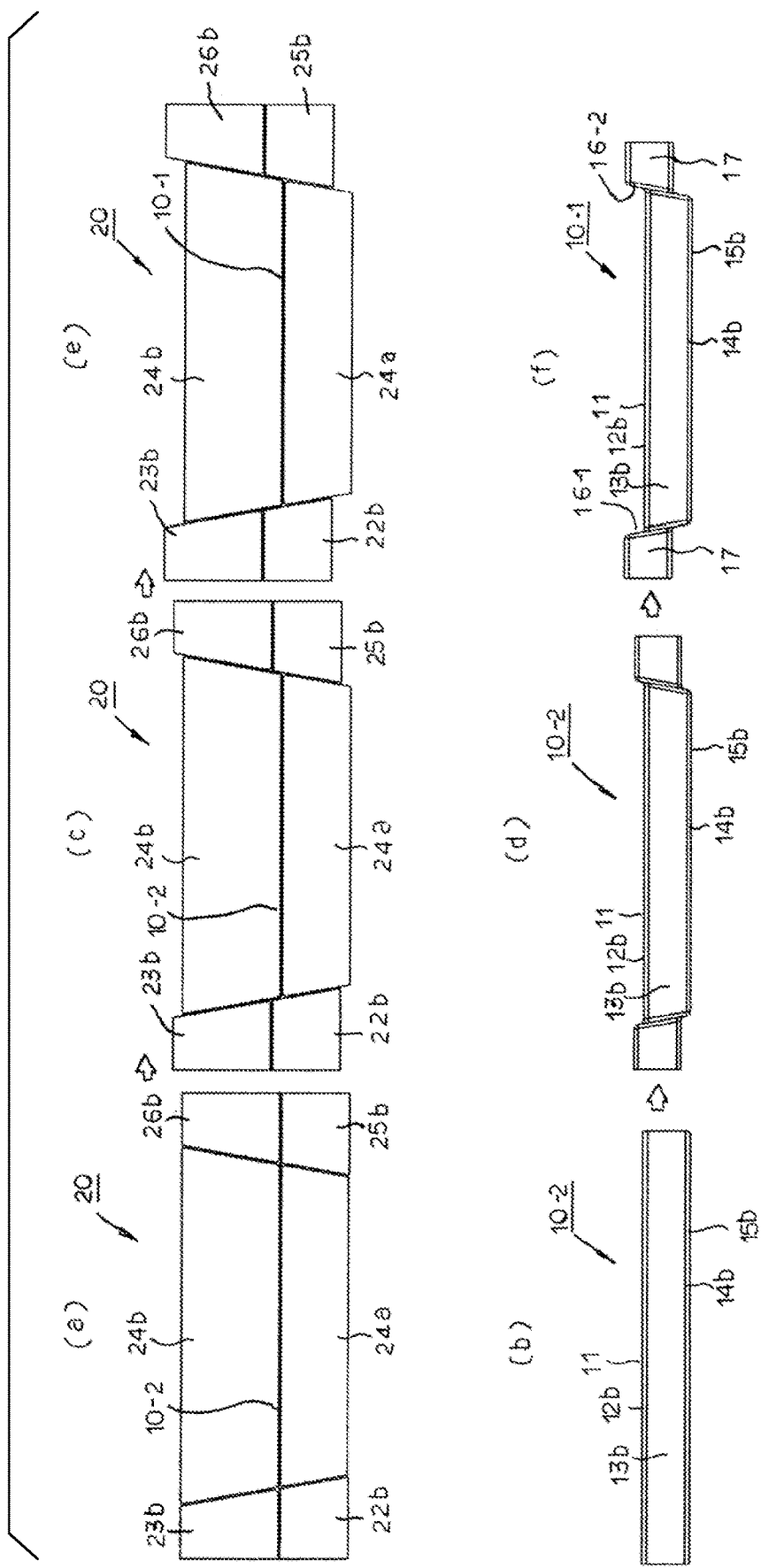
FIG. 7 is an explanatory view showing manufacturing of the intermediate formed article and the press-formed article by using the press-forming apparatus according to an embodiment of the present invention.

Further, FIG. 7 is an explanatory view showing manufacturing of the intermediate formed article 10-1 and the press-formed article 10 by using the press-forming apparatus 20 according to this embodiment.

(a) is a side view showing the press-forming apparatus 20 before forming the stepped portions 16-1, 16-2 which become the outward flanges, and (b) is a side view of the blank 10-2 picked up therefrom.

(c) is a side view showing the press-forming apparatus 20 when the stepped portions 16-1, 16-2 are being formed, and (d) is a side view showing the blank 10-2.

(e) is a side view showing the press-forming apparatus 20 after the stepped portions 16-1, 16-2 are formed, and (f) is a side view showing the intermediate formed article 10-1.

As shown in FIG. 2A to FIG. 2F, and FIG. 3 to FIG. 7, the press-forming apparatus 20 press forms the intermediate formed article 10-1 of the press-formed article 10 according to this embodiment described above.

As shown in FIG. 2A to FIG. 2F and FIG. 3 to FIG. 7, the press-forming apparatus 20 includes a set of a first punch 24a and a first die 24b, and a set of second punches 22a, 22b, 25a, 25d and second dies 23a, 23b, 26a, 26b.

For preparing the press-formed body 10-2 which is a blank, a separate step may be performed to preliminary form a product having a contour as shown in FIG. 4(b) by using a punch and a die. However, in view of the productivity, it is preferable to manufacture the press-formed body 10-2 from a flat blank by using a combination punch configured by the first punch 24a and the second punches 22a, 22b, 25a, 25b, and a combination die configured by the first die 24b and the second dies 23a, 23b, 26a, 26b, so as to form a contour as shown in FIG. 4(b).

The press-formed body 10-2 has a hat type cross section including a top sheet portion 11, two convex ridge line portions 12a, 12b continuing to the top sheet portion 11, two sidewalls 13a, 13b continuing to each of the two convex ridge line portions 12a, 12b, two concaved ridge line portions 14a, 14b continuing to each of the two sidewalls 13a, 13b, and two flanges 15a, 15b continuing to each of the two concaved ridge line portions 14a, 14b.

The first punch 24a and the first die 24b restrict a part of the press-formed body 10-2 which is adjacent to a portion to be formed to the stepped portions 16-1, 16-2 which become the outward flanges of the press-formed article 10 in the longitudinal direction. That is, the first punch 24a and the first die 24b restrict an inside portion from the stepped portions 16-1, 16-2.

Meanwhile, the second punches 22a, 22b, 25a, 25b, and the second dies 23a, 23b, 26a, 26b restrict the rest portion of the press-formed body 10-2 other than the portion to be formed to the stepped portions 16-1, 16-2 which become the outward flanges of the press-formed article 10 in the longitudinal direction. That is, the second punches 22a, 22b, 25a, 25b, and the second dies 23a, 23b, 26a, 26b restrict two outside portions from the stepped portions 16-1, 16-2.

In addition, all of the second punch 22a, the second die 23a, the second punch 22b, the second die 23b, the second punch 25a, the second die 26a, the second punch 25b, and the second die 26b are configured to be relatively movable in the oblique direction with respect to the first punch 24a and the first die 24b independently while restricting the press-formed body 10-2 without creating a clearance from the press-formed body 10-2. More specifically, the oblique direction is the direction with an angle not less than the tilting angle of the sidewall 13a, 13b, with respect to the top sheet portion 11 of the press-formed body 10-2.

More specifically, with reference to FIG. 2E, the press direction is preferably a direction in which all of the angles θ1, θ2, θ3 are not less than 20 degrees.

In FIG. 2E, the reference number 11 is a height (mm) of the stepped portion 16-1 (16-2) which becomes the outward flange continuing to the top sheet portion 11, the reference number 12 is a height (mm) of the stepped portion 16-1 (16-2) which becomes the outward flange continuing to the sidewall 13a, the reference sign h is a height (mm) of the sidewall 13a, the reference sign θ1 is an angle (°) formed by the press direction shown by the arrow and the extending direction of the top sheet portion 11, the reference sign θ2 is an angle (°) formed by the press direction shown by the arrow and the extending direction of the sidewall 13a, and the reference sign θ3 is an angle (°) formed by the press direction shown by the arrow and the extending direction of the flange 15a.

In addition, the reference sign θ4 is an opening angle of the sidewall 13a; the angle θ4 may be not less than zero (0) degree, and preferably, the angle θ4 may be not less than 20 degrees.

A driving unit (moving mechanism), that moves the second punch 22a, the second die 23a, the second punch 22b, the second die 23b, the second punch 25a, the second die 26a, the second punch 25b, and the second die 26b with respect to the first punch 24a and the first die 24b in this manner, is not limited to a particular driving unit. For example, a general mechanism used as this type driving unit (such as cum-slide mechanism or a actuator (cylinder) driving mechanism) may be used.

Next, a press-forming method according to this embodiment will be explained. In the press-forming method according to this embodiment, by using the press-forming apparatus 20, the first punch 24a and the first die 24b restrict a first part of the press-formed body 10-2 which is adjacent to a portion to be formed to the stepped portion 16-1, 16-2 which becomes outward flange of the press-formed article 10 in the longitudinal direction, that is, an inside portion from the stepped portion 16-1, 16-2. Then, while maintaining this restraining state of the press-formed body 10-2 without creating a clearance between the press-formed body 10-2 and all of the second punch 22a, the second die 23a, the second punch 22b, the second die 23b, the second punch 25a, the second die 26a, the second punch 25b, and the second die 26b, the press-forming apparatus 20 moves these punches and dies independently and individually in the relatively oblique direction with respect to the first punch 24a and the first die 24b (shearing step). More specifically, the oblique direction is, as explained above, the direction with an angle not less than the tilting angle of the sidewall 13a, 13b with respect to the top sheet portion of the press-formed body 10-2.

Accordingly, the stepped portions 16-1, 16-2 are formed by shearing deformation at middle positions in the longitudinal direction of the press-formed body 10-2 such that each of the stepped portion 16-1, 16-2 continues to all of the top sheet portion 11, two of the convex ridge line portions 12a, 12b, two of the sidewalls 13a, 13b, two of the concaved ridge line portions 14a, 14g, and two of the flanges 15a, 15b, and extends in the direction intersecting with each of the top sheet portion 11, two of the convex ridge line portions 12a, 12b, two of the sidewalls 13a, 13b, two of the concaved ridge line portions 14a, 14g, and two of the flanges 15a, 15b. As a result, the intermediate formed article 10-1 is manufactured.

Thereafter, an unnecessary portion 17 near the stepped portions 16-1, 16-2 of the intermediate formed article 10-1 is removed by a suitable means (for example, laser cutting or a cum trimming), whereby the press-formed article 10 according to this embodiment is manufactured (removing step).

As the stepped portions 16-1, 16-2 are formed by the shearing deformation, the sheet thickness is substantially not reduced. Accordingly, the outward flanges 16-1, 16-2 of the press-formed article 10 can satisfy the Equation 1 and the Equation 2 described above where, in the same unit (for example, mm), $T_{Ave}$ is the average thickness of the outward flange, $T_{Min}$ is the minimum thickness of the outward flange, and $T_{Max}$ is the maximum thickness of the outward flange.

In this manner, by using the press-forming apparatus 20, a press-formed article 10 such as a floor cross member can be manufactured without providing a cutout in the curving section of the outward flange 16-1, 16-2. The press-formed article 10 formed in this manner has a cross section including the top sheet portion 11, the convex ridge line portion 12a or 12b continuing to the top sheet portion 11, a sidewall 13a or 13b continuing to the convex ridge line portion 12a or 12b, a concaved ridge line portion 14a or 14b continuing to the sidewall 13a or 13b, and a flange 15a or 15b continuing to the concaved ridge line portion 14a or 14b. In addition, the press-formed article 10 formed in this manner has an outward flange 16-1 or 16-2 at least continuing from the top sheet portion 11 to the flange 15a or 15b at one or both of the two end portions 10A, 10B in the longitudinal direction.

(2) Embodiment 2

In FIG. 8A to FIG. 23 which are referred to in the following explanation, with respect to the punch and the die, reference numbers are assigned such as first punch 24a-1, first die 24b-1, second punches 22a-1 to 3, 22b-1 to 3, 25a-1 to 3, 25b-1 to 3, and second dies 23a-1 to 3, 23b-1 to 3, 26a-1 to 3, 26b-1 to 3. The difference of the number assigned after the symbol "–" means that merely the outer surface shape of the punch or the inner surface shape of the die is modified.

Figure 8A:
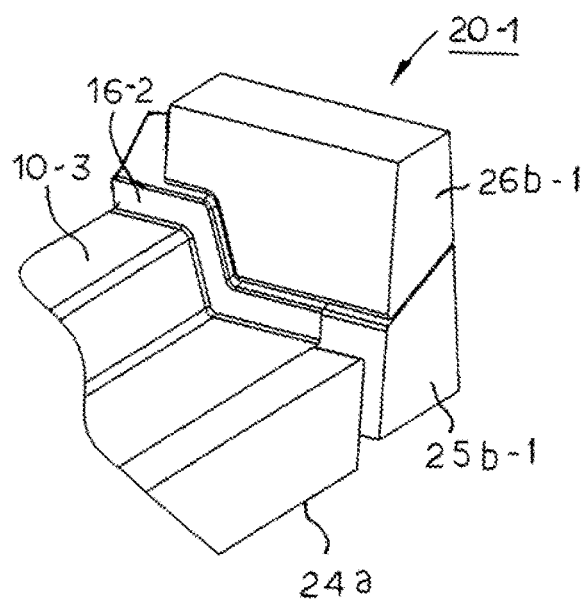
FIG. 8A is an explanatory view showing an overview of a state where an intermediate formed article of the press-formed article is manufactured by using the press-forming apparatus according to an embodiment of the present invention, and is a perspective view showing a main part of the press-forming apparatus after the stepped portion, which becomes the outward flange, is formed.
Figure 8B:
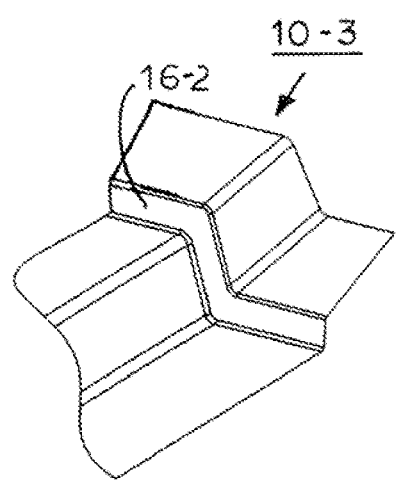
FIG. 8B is a perspective view showing a main part of the intermediate formed article formed with the stepped portion.
Figure 8C:
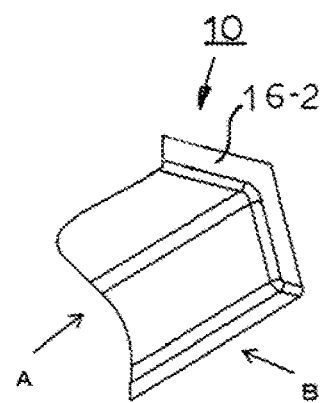
FIG. 8C is a perspective view showing an area in the vicinity of the outward flange of the press-formed article.
Figure 8D:
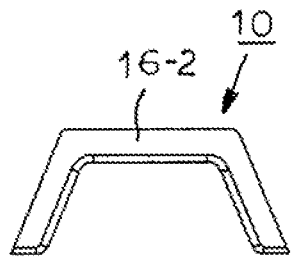
FIG. 8D is an A-arrow view in FIG. 8C.
Figure 8E:
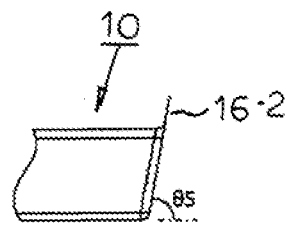
FIG. 8E is a B-arrow view in FIG. 8C.

FIG. 8A to FIG. 8F are explanatory views showing an overview of a state where an intermediate formed article 10-3 of the press-formed article 10 is manufactured by using a press-forming apparatus 20-1 according to this embodiment. FIG. 8A is a perspective view showing a main part of the press-forming apparatus 20-1 after forming the stepped portion 16-2 which becomes the outward flange. FIG. 8B is a perspective view showing a main part of the intermediate formed article 10-3 formed with the stepped portion 16-2. FIG. 8C is a perspective view showing an area in the vicinity of the outward flange 16-2 of the press-formed article 10. FIG. 8D is an A-arrow view in FIG. 8C. FIG. 8E is an explanatory view showing factors associated with the formability of the outward flange 16-2. FIG. 8F is a B-arrow view in FIG. 8C.

Figure 9:
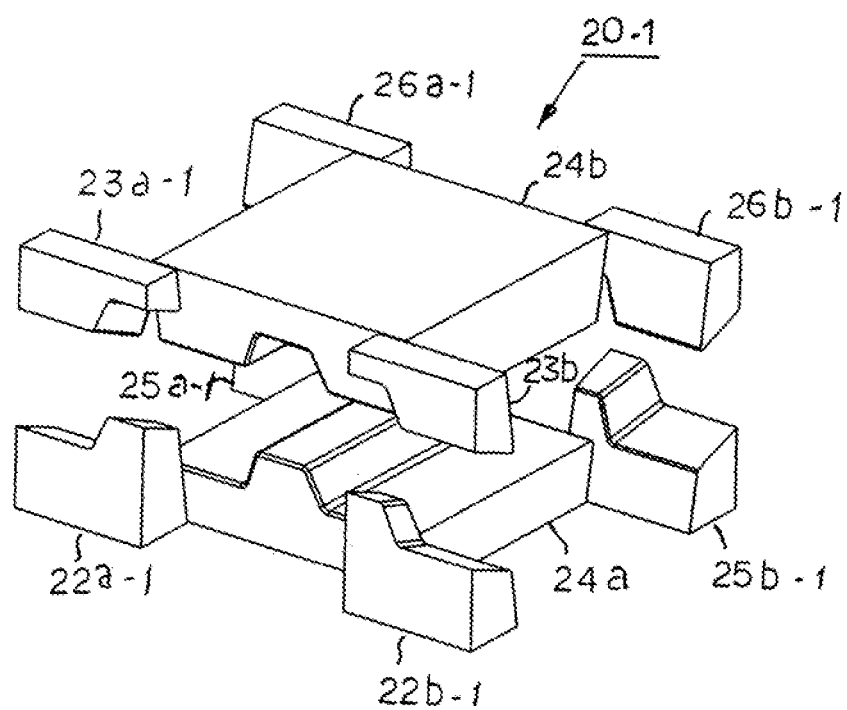
FIG. 9 is a perspective view showing members of the press-forming apparatus according to an embodiment of the present invention.

FIG. 9 is a perspective view showing members of the press-forming apparatus 20-1 according to this embodiment.

Figure 10:
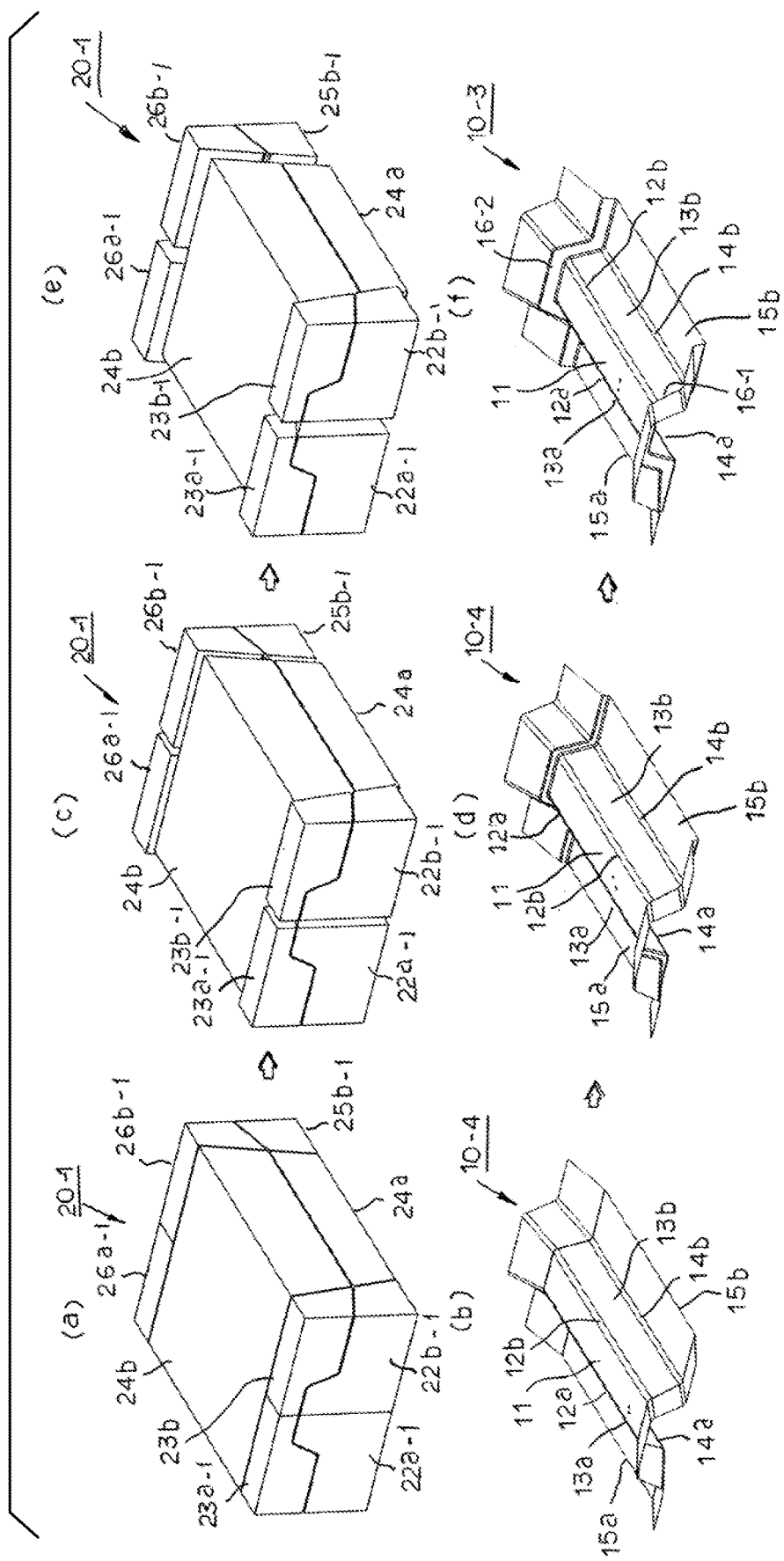
FIG. 10 is an explanatory view showing manufacturing of the intermediate formed article and the press-formed article by using the press-forming apparatus according to an embodiment of the present invention.

FIG. 10 is an explanatory view showing manufacturing of the intermediate formed article 10-3 and the press-formed article 10 by using the press-forming apparatus 20-1 according to this embodiment.

(a) is a perspective view showing the press-forming apparatus 20-1 before forming the stepped portions 16-1, 16-2 which become outward flanges, and (b) is a perspective view showing the blank 10-4 picked up therefrom.

(c) is a perspective view showing the press-forming apparatus 20-1 when the stepped portions 16-1, 16-2 are being formed, and (d) is a perspective view showing the blank 10-4.

(e) is a perspective view showing the press-forming apparatus 20-1 after forming the stepped portions 16-1, 16-2, and (f) is a perspective view showing the intermediate formed article 10-3.

Figure 11:
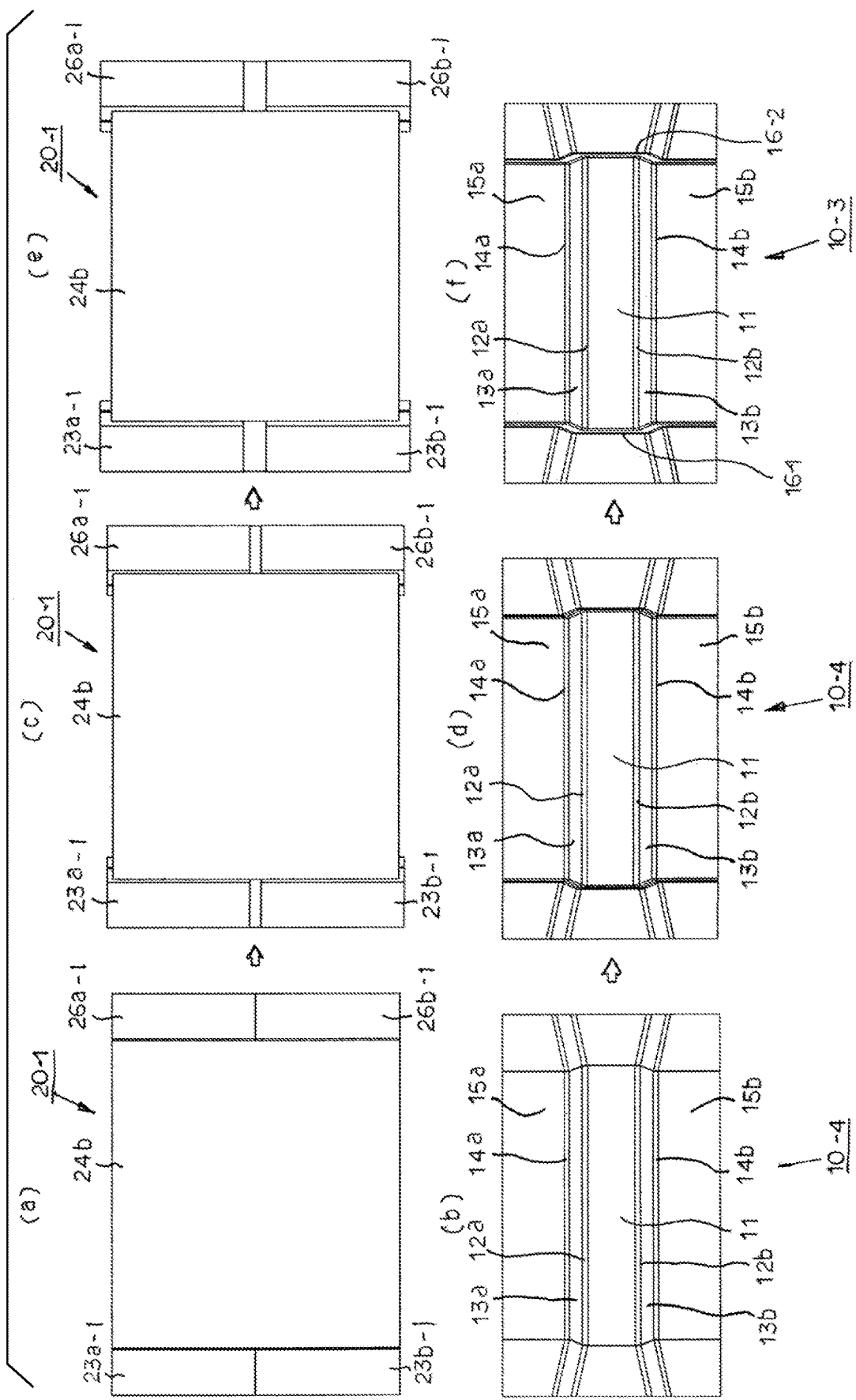
FIG. 11 is an explanatory view showing manufacturing of the intermediate formed article and the press-formed article by using the press-forming apparatus according to an embodiment of the present invention.

FIG. 11 is an explanatory view showing manufacturing of the intermediate formed article 10-3 and the press-formed article 10 by using the press-forming apparatus 20-1 according to this embodiment.

(a) is a top view showing the press-forming apparatus 20-1 before forming the stepped portions 16-1, 16-2 which become outward flanges, and (b) is a top view showing the blank 10-4 picked up therefrom.

(c) is a top view showing the press-forming apparatus 20-1 when the stepped portions 16-1, 16-2 are being formed, and (d) is a top view showing the blank 10-4.

(e) is a top view showing the press-forming apparatus 20-1 after forming the stepped portions 16-1, 16-2, and (f) is a top view showing the intermediate formed article 10-3.

Figure 12:
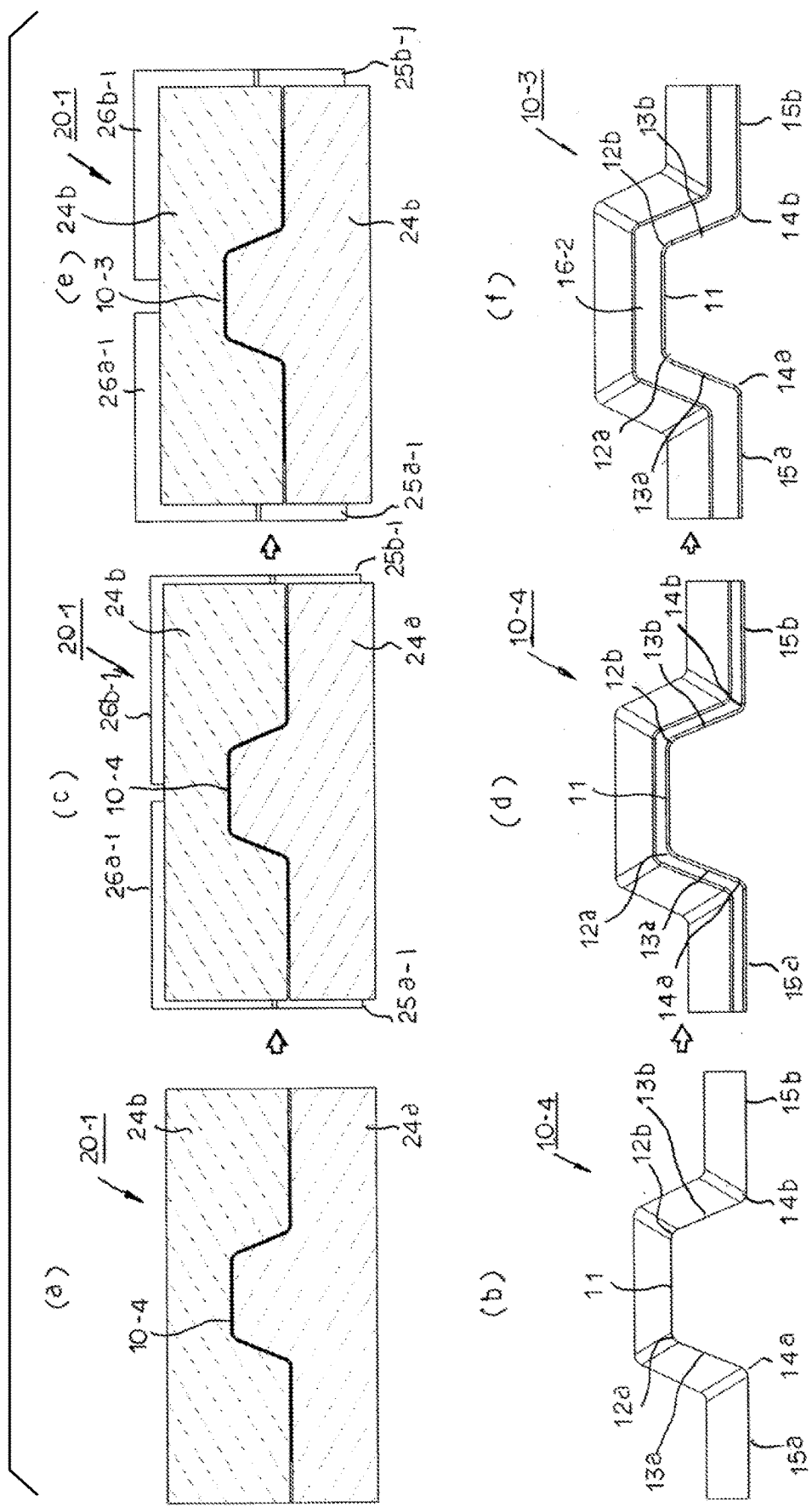
FIG. 12 is an explanatory view showing manufacturing of the intermediate formed article and the press-formed article by using the press-forming apparatus according to an embodiment of the present invention.

FIG. 12 is an explanatory view showing manufacturing of the intermediate formed article 10-3 and the press-formed article 10 by using the press-forming apparatus 20-1 according to this embodiment.

(a) is a front view showing the press-forming apparatus 20-1 before forming the stepped portions 16-1, 16-2 which become outward flanges, and (b) is a front view showing the blank 10-4 picked up therefrom.

(c) is a front view showing the press-forming apparatus 20-1 when the stepped portions 16-1, 16-2 are being formed, and (d) is a front view showing the blank 10-4.

(e) is a front view showing the press-forming apparatus 20-1 after forming the stepped portions 16-1, 16-2, and (f) is a front view showing the intermediate formed article 10-3.

Figure 13:
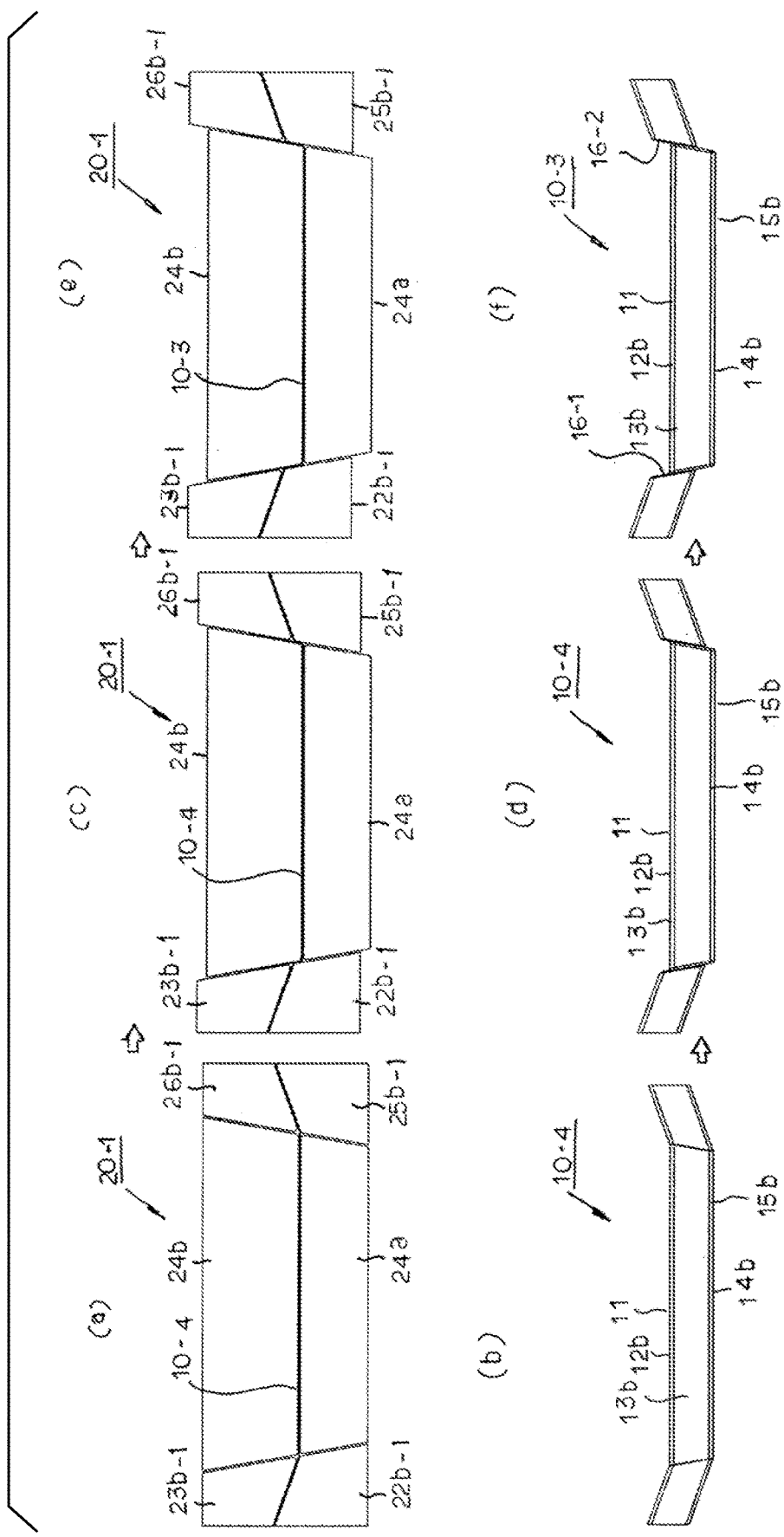
FIG. 13 is an explanatory view showing manufacturing of the intermediate formed article and the press-formed article by using the press-forming apparatus according to an embodiment of the present invention.

Further, FIG. 13 is an explanatory view showing manufacturing of the intermediate formed article 10-3 and the press-formed article 10 by using the press-forming apparatus 20-1 according to this embodiment.

(a) is a side view showing the press-forming apparatus 20-1 before forming the stepped portions 16-1, 16-2 which become outward flanges, and (b) is a side view showing the blank 10-4 picked up therefrom.

(c) is a front view showing the press-forming apparatus 20-1 when the stepped portions 16-1, 16-2 are being formed, and (d) is a side view showing the blank 10-4.

(e) is a side view showing the press-forming apparatus 20-1 after forming the stepped portions 16-1, 16-2, and (f) is a side view showing the intermediate formed article 10-3.

The embodiment 2 differs from the aforementioned embodiment 1 in that the forming is performed such that the width of the top sheet portion 11 of the intermediate formed article 10-3, formed by the second punch 22*a*-1, the second die 23*a*-1, the second punch 22*b*-1, the second die 23*b*-1, the second punch 25*a*-1, the second die 26*a*-1, the second punch 25*b*-1, and the second die 26*b*-1, are widened as a distance from the stepped portion 16-1, 16-2 increases. By performing the forming in this manner, when the shearing forming of the stepped portions 16-1, 16-2 is performed, long cross sectional circumferential length is preliminary secured and the cross sectional circumferential length is reduced thereafter, the material flow toward the stepped portions 16-1, 16-2 can be promoted. Accordingly, cracks generated at a portion where the stepped portions 16-1, 16-2 and the convex ridge line portion 12*a*, 12*b* are met can be effectively suppressed.

(3) Embodiment 3

Figure 14:
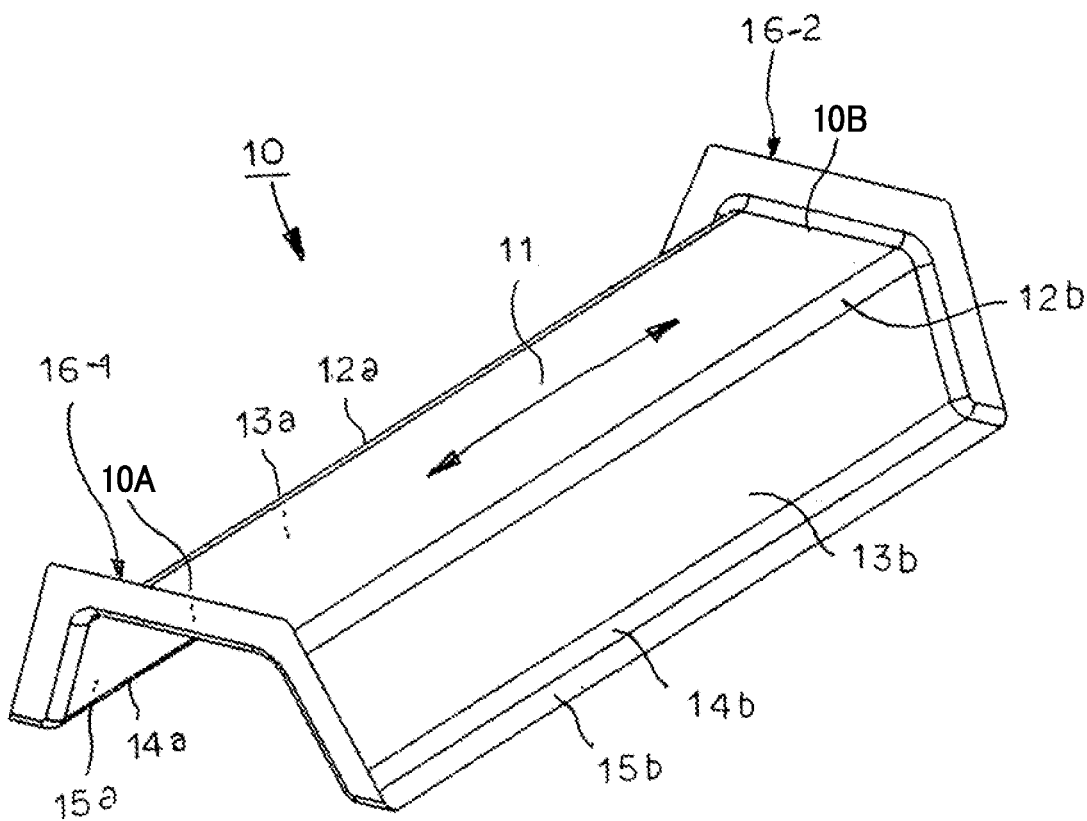
FIG. 14 is a perspective view showing the press-formed article according to an embodiment of the present invention.

FIG. 14 is a perspective view showing the press-formed article 10 according to the present embodiment.

FIG. 15 is an explanatory view showing an overview of a state where an intermediate formed article 10-5 of the press-formed article 10 is manufactured by using a press-forming apparatus 20-2 according to this embodiment.

Figure 15A:
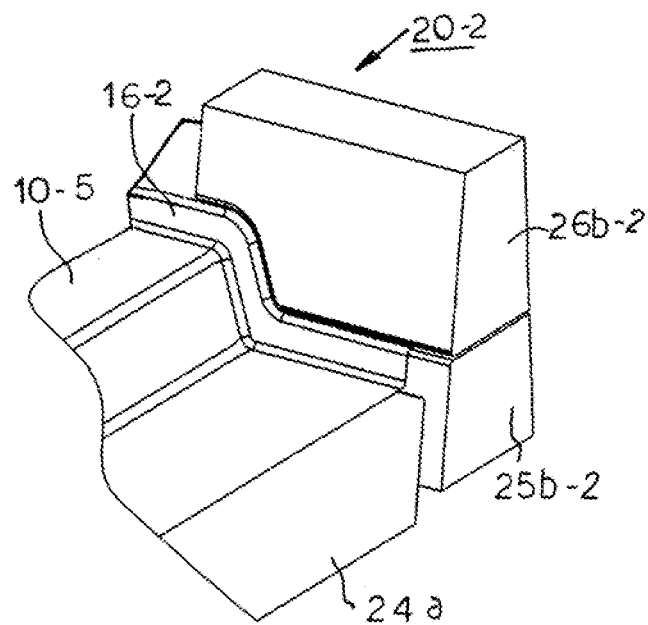
FIG. 15A is explanatory view showing an overview of a state where an intermediate formed article of the press-formed article is manufactured by using the press-forming apparatus according to an embodiment of the present invention, and is a perspective view showing a main part of the press-forming apparatus after forming the stepped portion which becomes the outward flange.
Figure 15B:
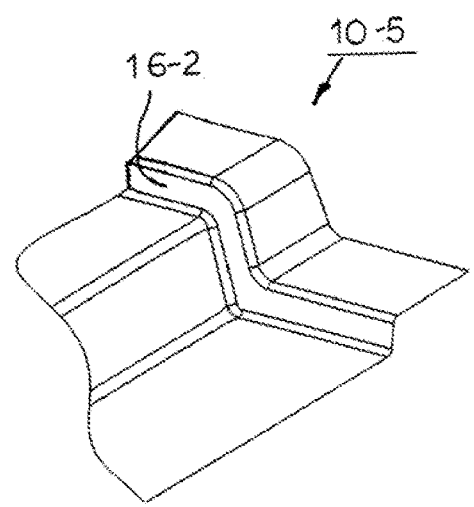
FIG. 15B is a perspective view showing a main part of the intermediate formed article formed with the stepped portion.
Figure 15C:
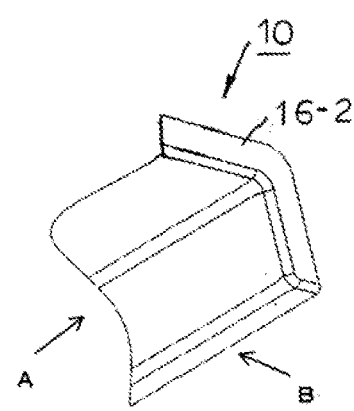
FIG. 15C is a perspective view showing an area in the vicinity of the outward flange of the press-formed article.
Figure 15D:
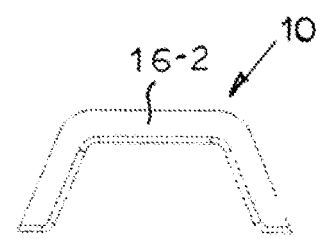
FIG. 15D is an A-arrow view in FIG. 15C.
Figure 15E:
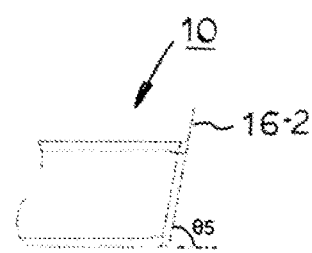
FIG. 15E is a B-arrow view in FIG. 15C.

FIG. 15A is a perspective view showing a main part of the press-forming apparatus 20-2 after forming the stepped portion 16-2 which becomes the outward flange. FIG. 15B is a perspective view showing a main part of the intermediate formed article 10-5 formed with the stepped portion 16-2. FIG. 15C is a perspective view showing an area in the vicinity of the outward flange 16-2 of the press-formed article 10. FIG. 15D is an A-arrow view in FIG. 15C. FIG. 15E is a B-arrow view in FIG. 15C.

Figure 16:
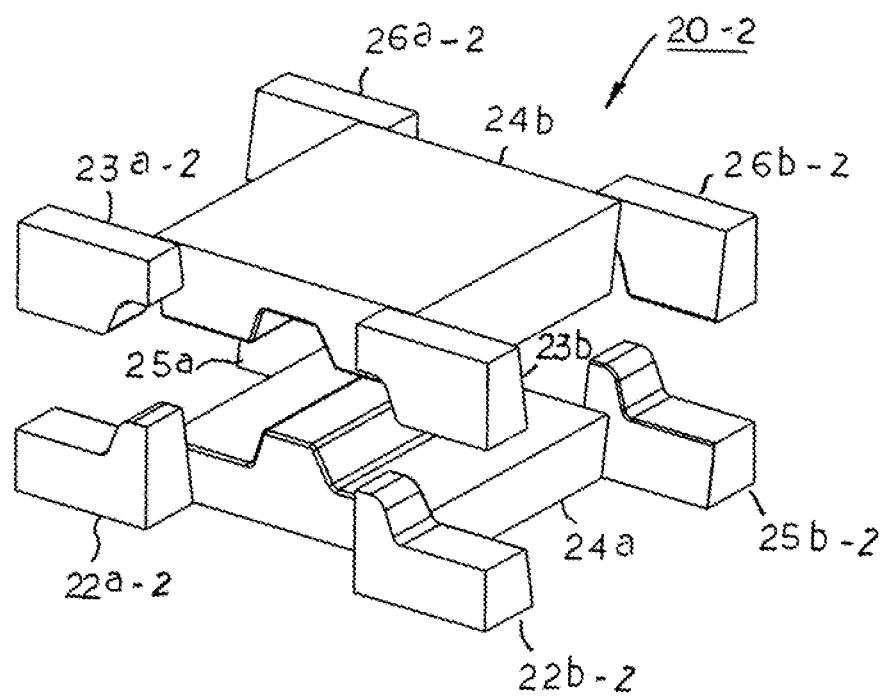
FIG. 16 is a perspective view showing members of the press-forming apparatus according to an embodiment of the present invention.

FIG. 16 is a perspective view showing members of the press-forming apparatus 20-2 according to this embodiment.

Figure 17:
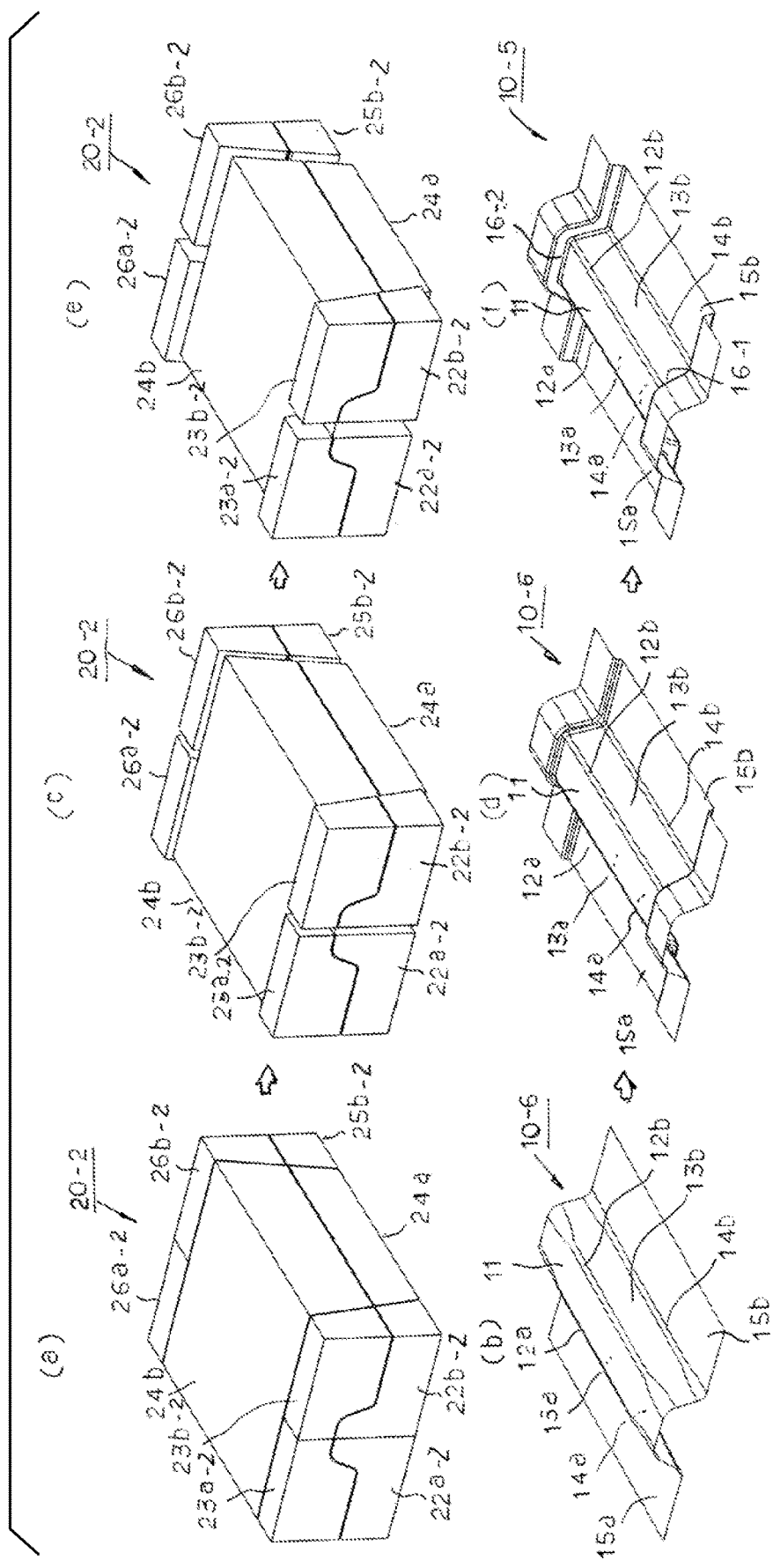
FIG. 17 is an explanatory view showing manufacturing of the intermediate formed article and the press-formed article by using the press-forming apparatus according to an embodiment of the present invention.

FIG. 17 is an explanatory view showing manufacturing of the intermediate formed article 10-5 and the press-formed article 10 by using the press-forming apparatus 20-2 according to this embodiment.

(a) is a perspective view showing the press-forming apparatus 20-2 before forming the stepped portions 16-1, 16-2 which become outward flanges, and (b) is a perspective view showing the blank 10-6 picked up therefrom.

(c) is a perspective view showing the press-forming apparatus 20-2 when the stepped portions 16-1, 16-2 are being formed, and (d) is a perspective view showing the blank 10-6.

(e) is a perspective view showing the press-forming apparatus 20-2 after forming the stepped portions 16-1, 16-2, and (f) is a perspective view showing the intermediate formed article 10-5.

Figure 18:
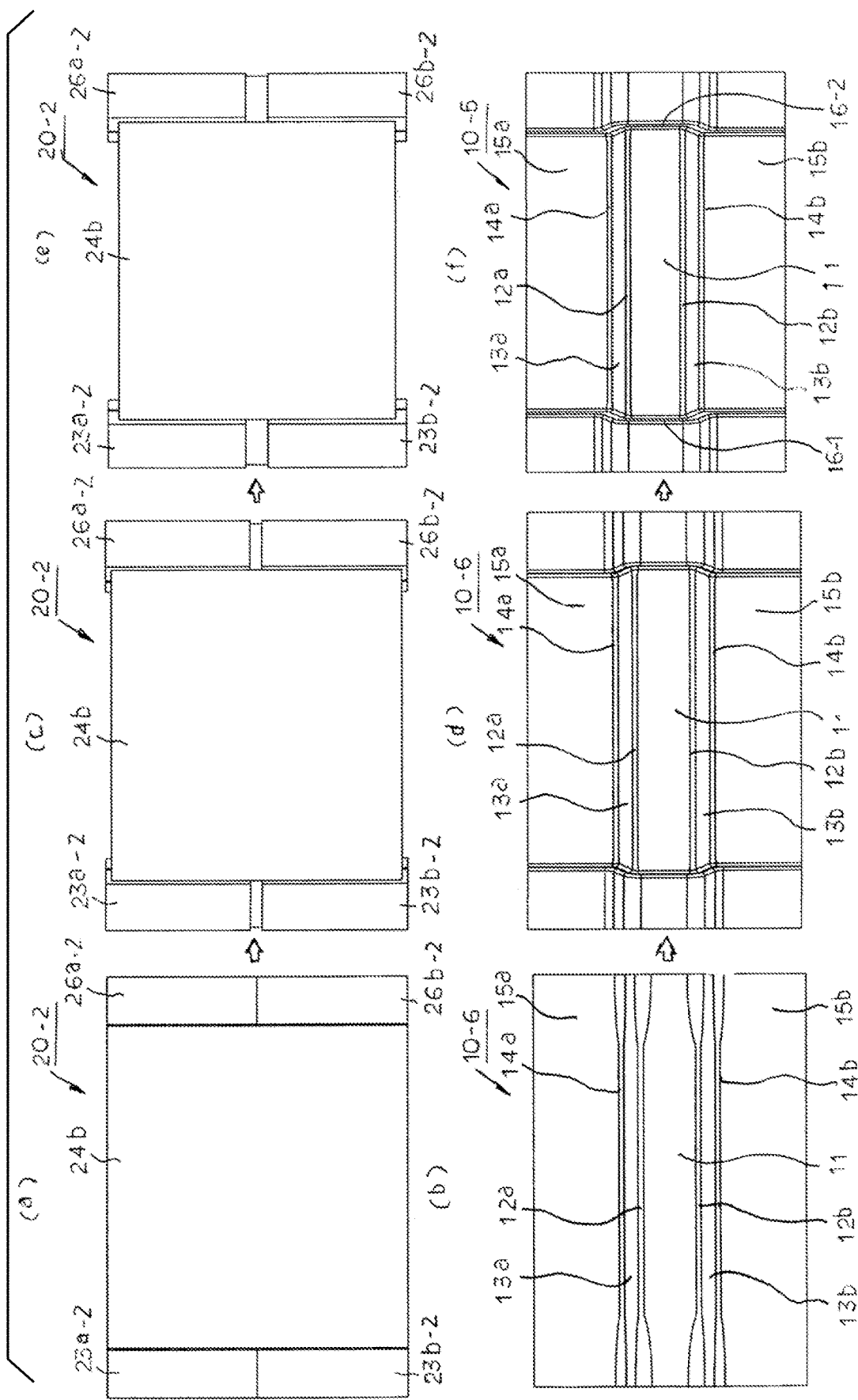
FIG. 18 is an explanatory view showing manufacturing of the intermediate formed article and the press-formed article by using the press-forming apparatus according to an embodiment of the present invention.

FIG. 18 is an explanatory view showing manufacturing of the intermediate formed article 10-5 and the press-formed article 10 by using the press-forming apparatus 20-2 according to this embodiment.

(a) is a top view showing the press-forming apparatus 20-2 before forming the stepped portions 16-1, 16-2 which become outward flanges, and (b) is a top view showing the blank 10-6 picked up therefrom.

(c) is a top view showing the press-forming apparatus 20-2 when the stepped portions 16-1, 16-2 are being formed, and (d) is a top view showing the blank 10-6.

(e) is a top view showing a press-forming apparatus 20-2 after forming the stepped portions 16-1, 16-2, and (f) is a top view showing the intermediate formed article 10-5.

Figure 19:
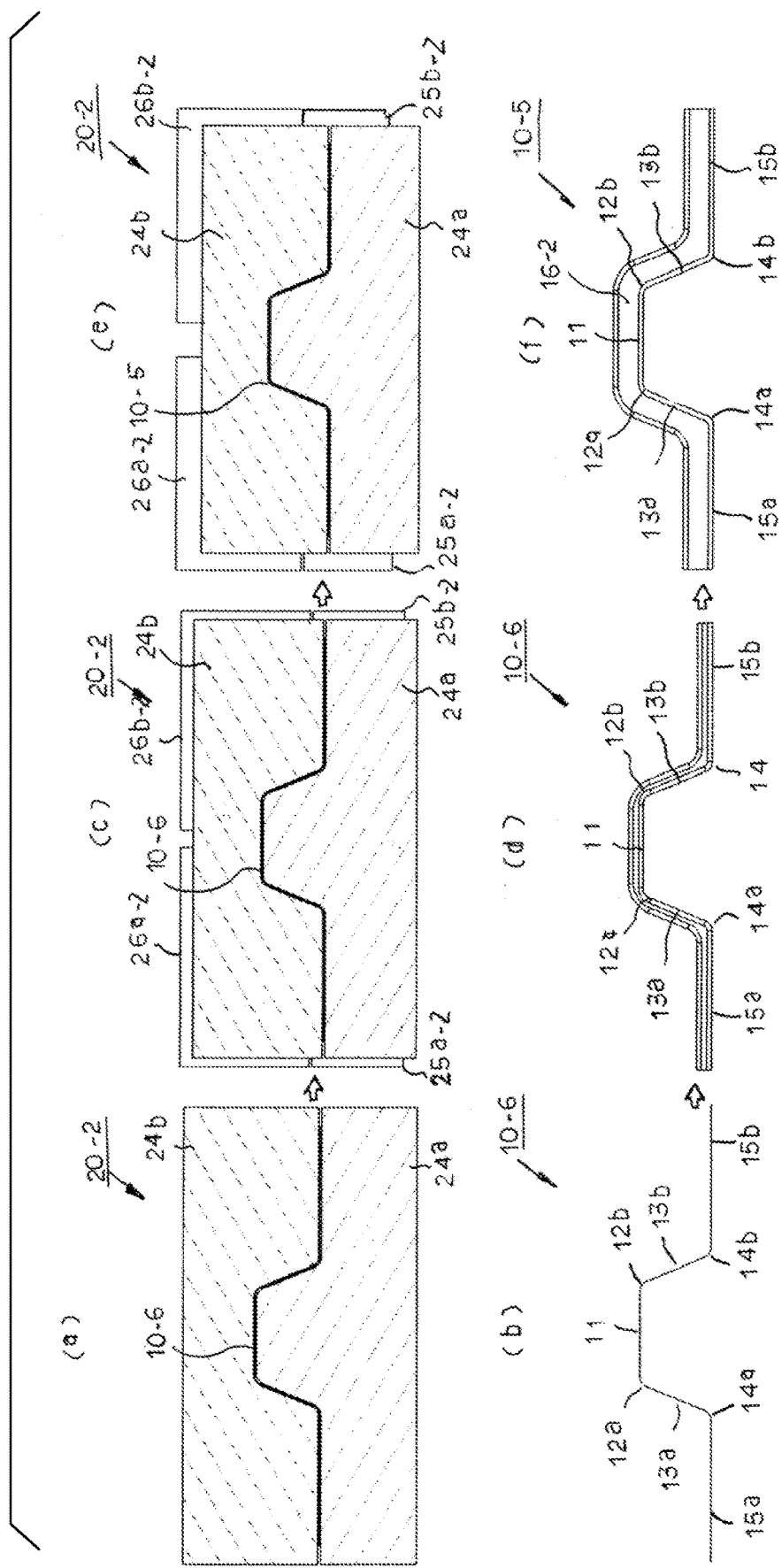
FIG. 19 is an explanatory view showing manufacturing of the intermediate formed article and the press-formed article by using the press-forming apparatus according to an embodiment of the present invention.

FIG. 19 is an explanatory view showing manufacturing of the intermediate formed article 10-5 and the press-formed article 10 by using the press-forming apparatus 20-2 according to this embodiment.

(a) is a front view showing the press-forming apparatus 20-2 before forming the stepped portions 16-1, 16-2 which become outward flanges, and (b) is a front view showing the blank 10-6 picked up therefrom.

(c) is a front view showing the press-forming apparatus 20-2 when the stepped portions 16-1, 16-2 are being formed, and (d) is a front view showing the blank 10-6.

(e) is a front view showing the press-forming apparatus 20-2 after forming the stepped portions 16-1, 16-2, and (f) is a front view showing the intermediate formed article 10-5.

Figure 20:
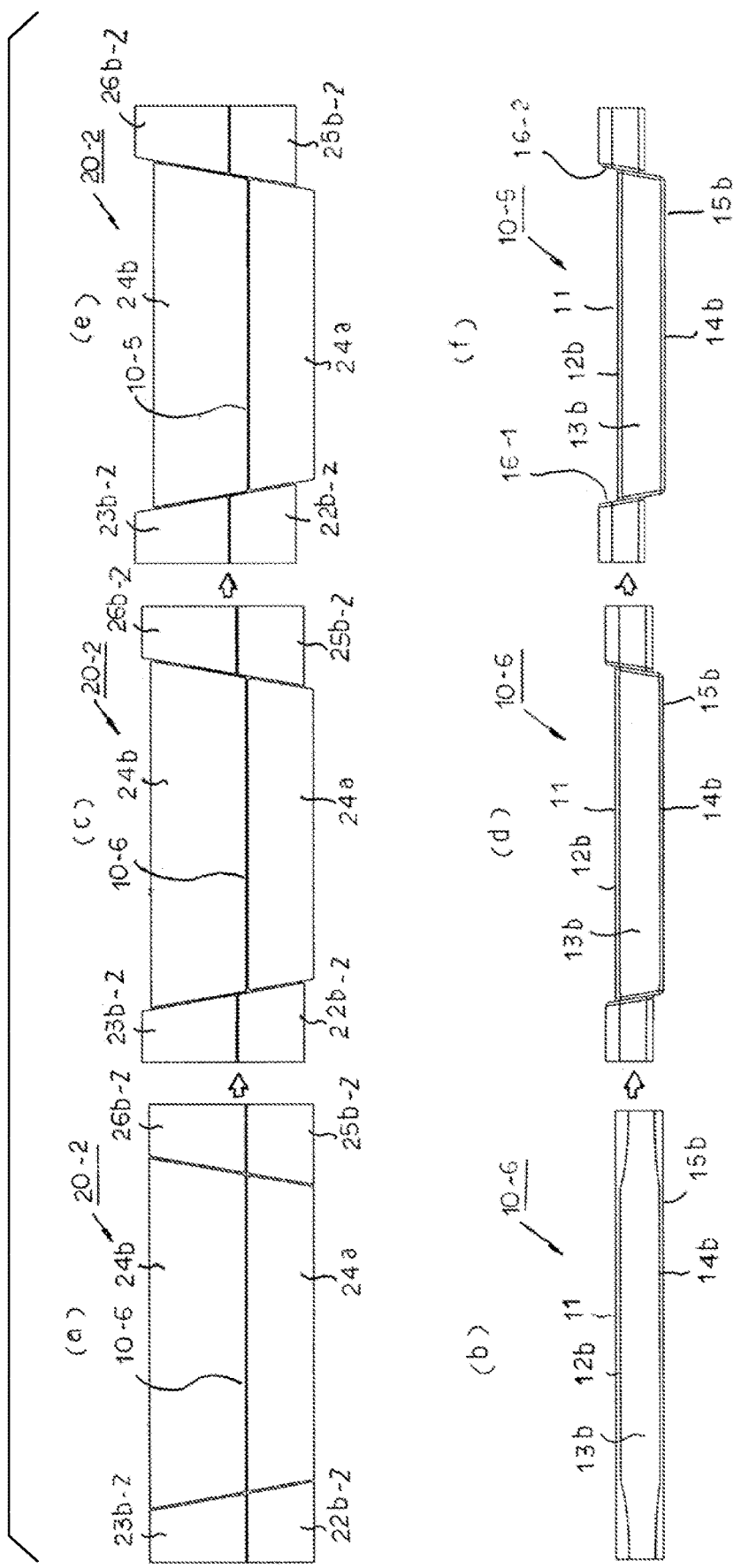
FIG. 20 is an explanatory view showing manufacturing of the intermediate formed article and the press-formed article by using the press-forming apparatus according to an embodiment of the present invention.

FIG. 20 is an explanatory view showing manufacturing of the intermediate formed article 10-5 and the press-formed article 10 by using the press-forming apparatus 20-2 according to this embodiment.

(a) is a side view showing the press-forming apparatus 20-2 before forming the stepped portions 16-1, 16-2 which become outward flanges, and (b) is a side view showing the blank 10-6 picked up therefrom.

(c) is a side view showing the press-forming apparatus 20-2 when the stepped portions 16-1, 16-2 are being formed, and (d) is a side view showing the blank 10-6.

(e) is a side view showing the press-forming apparatus 20-2 after forming the stepped portions 16-1, 16-2, and (f) is a side view showing the intermediate formed article 10-5.

The embodiment 3 differs from the aforementioned embodiment 1 in that the forming is performed such that the radius of curvature of the convex ridge line portions 12a, 12b of the intermediate formed article 10-3, formed by the second punch 22a-2, the second die 23a-2, the second punch 22b-2, the second die 23b-2, the second punch 25a-2, the second die 26a-2, the second punch 25b-2, and the second die 26b-2, becomes larger than the radius of curvature of the convex ridge line portions 12a, 12b of the intermediate formed article 10-3 restricted by the first punch 24a and the first die 24b.

By performing the forming in this manner, when the sharing shearing forming of the stepped portions 16-1, 16-2 is performed, the cross sectional circumferential length difference and the projecting shape are alleviated and thus the material flow toward the stepped portions 16-1, 16-2 is promoted. Accordingly, cracks generated at a portion where the stepped portions 16-1, 16-2 and the convex ridge line portion 12a, 12b are met (a stretch flange forming portion) can be effectively suppressed.

(4) Embodiment 4

Figure 21:
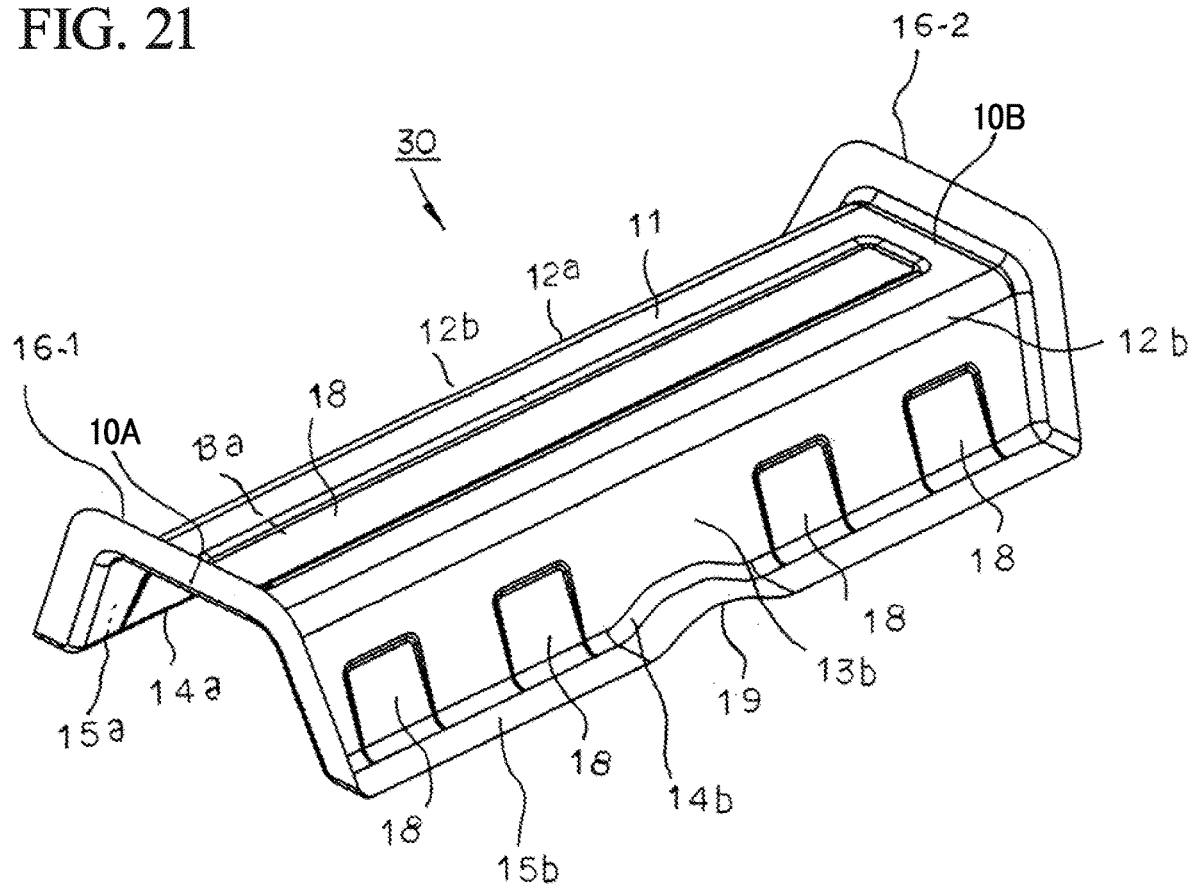
FIG. 21 is a perspective view showing another example of the press-formed article according to the present embodiment.

FIG. 21 is a perspective view showing a press-formed article 30 according to the present embodiment.

FIG. 22 is an explanatory view showing an overview of a state where an intermediate formed article 10-7 of the press-formed article 30 is manufactured by using a press-forming apparatus 20-3 according to this embodiment.

Figure 22A:
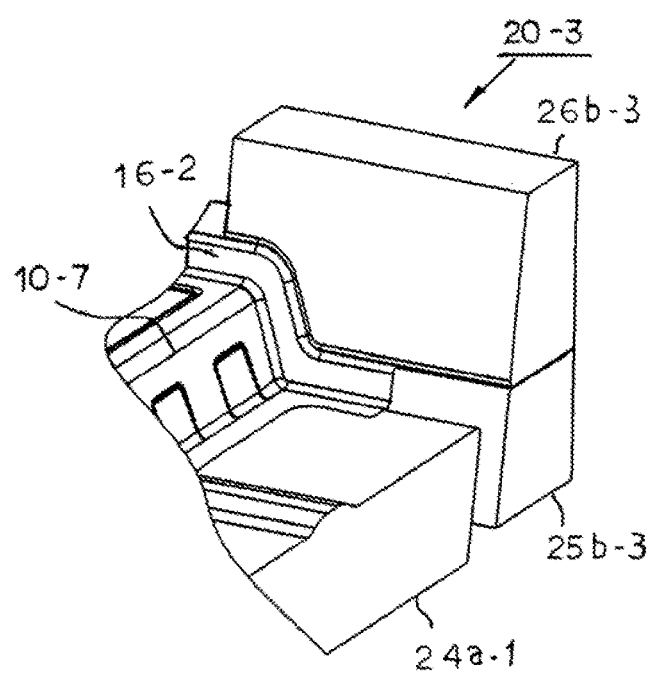
FIG. 22A is explanatory view showing an overview of a state where an intermediate formed article of the press-formed article is manufactured by using the press-forming apparatus according to an embodiment of the present invention, and is a perspective view showing a main part of the press-forming apparatus after forming the stepped portion which becomes the outward flange.
Figure 22B:
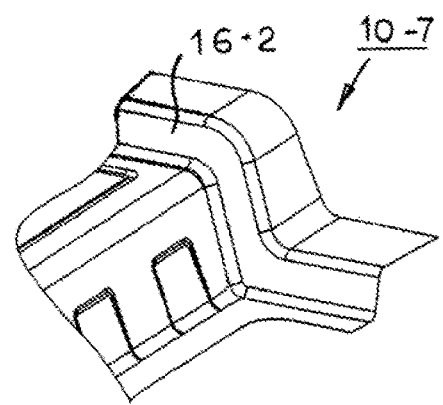
FIG. 22B is a perspective view showing a main part of the intermediate formed article formed with the stepped portion.
Figure 22C:
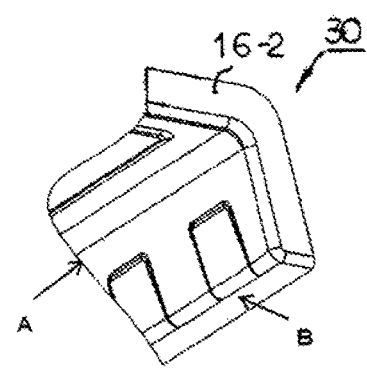
FIG. 22C is a perspective view showing an area in the vicinity of the outward flange of the press-formed article.
Figure 22D:
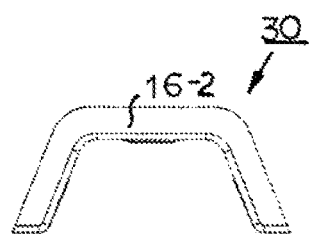
FIG. 22D is an A-arrow view in FIG. 22C.
Figure 22E:
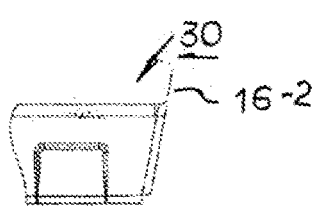
FIG. 22E is a B-arrow view in FIG. 22C.

FIG. 22A is a perspective view showing a main part of the press-forming apparatus 20-3 after forming the stepped portion 16-2 which becomes the outward flange. FIG. 22B is a perspective view showing a main part of the intermediate formed article 10-7 formed with the stepped portion 16-2. FIG. 22C is a perspective view showing an area in the vicinity of the outward flange 16-2 of the press-formed article 30. FIG. 22D is an A-arrow view in FIG. 22C. FIG. 22E is a B-arrow view in FIG. 22C.

Figure 23:
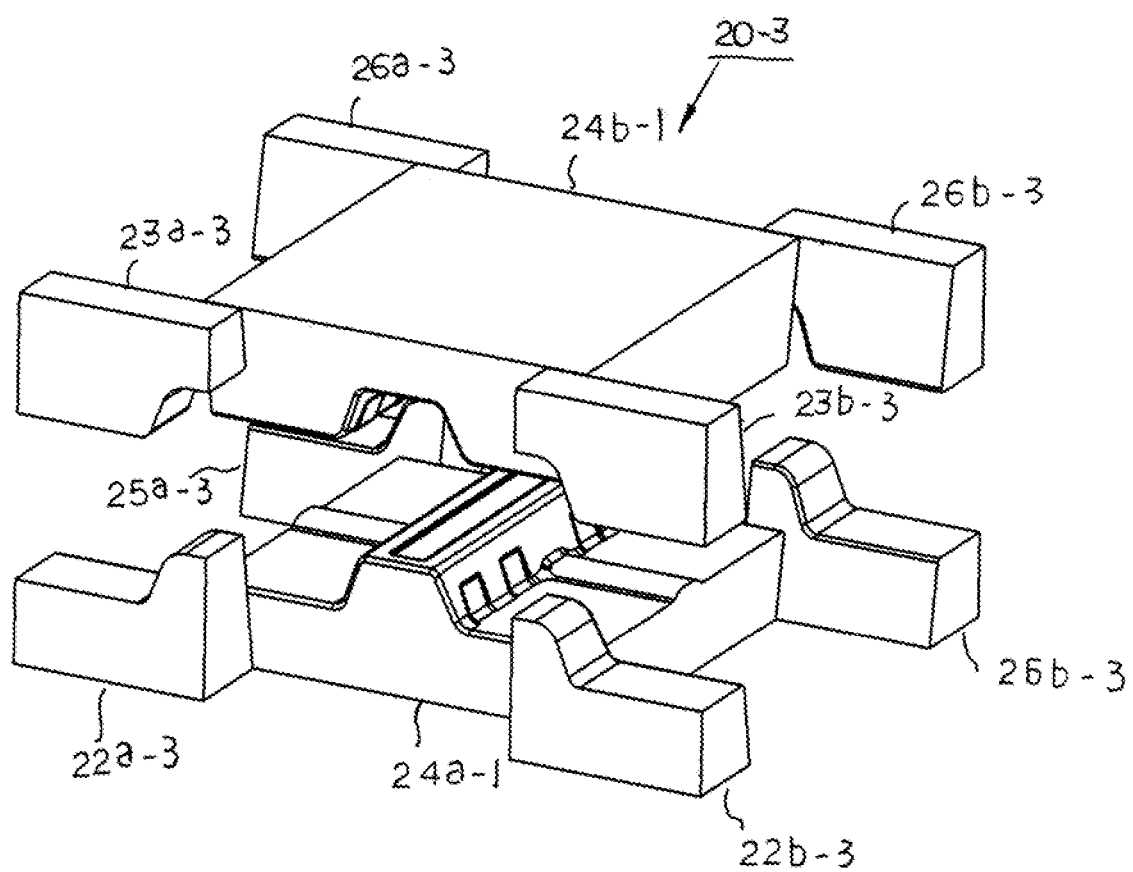
FIG. 23 is a perspective view showing members of the press-forming apparatus according to an embodiment of the present invention.

FIG. 23 is a perspective view showing members of the press-forming apparatus 20-3 according to this embodiment.

Figure 24:
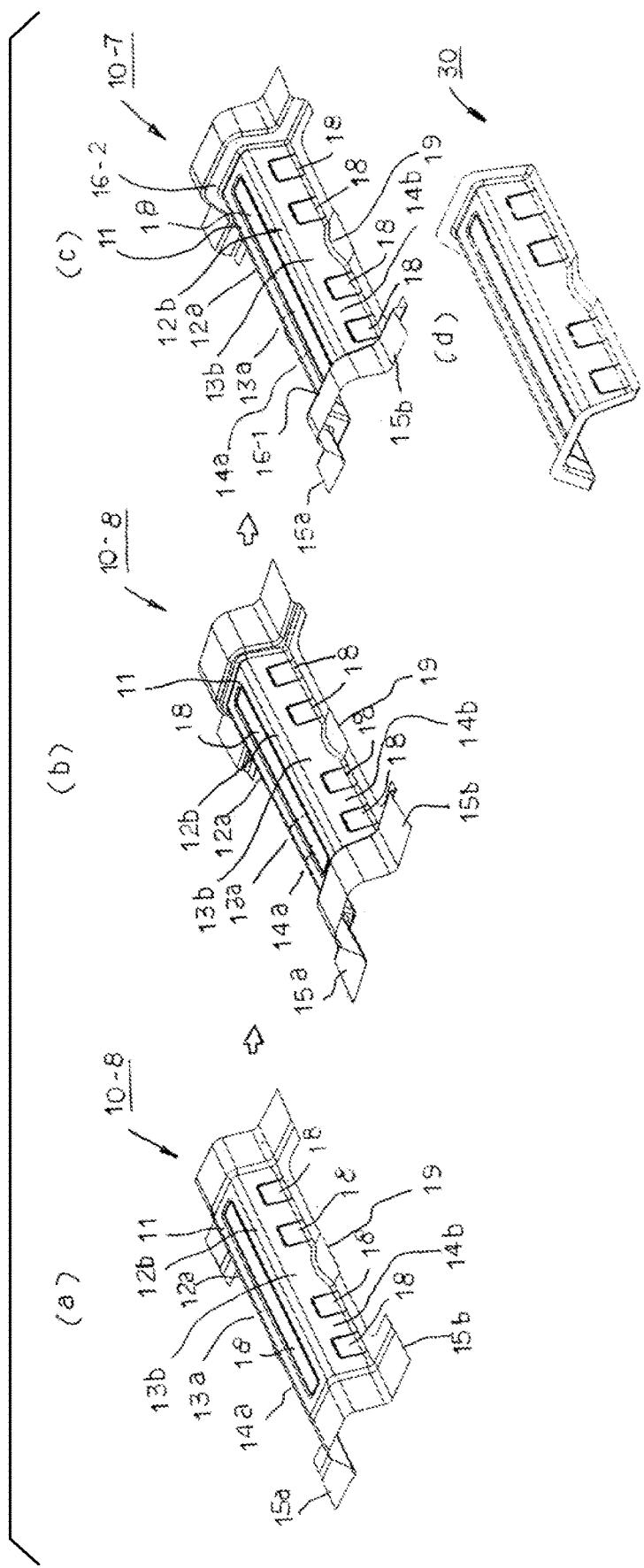
FIG. 24 is an explanatory view showing manufacturing of the intermediate formed article and the press-formed article by using the press-forming apparatus according to an embodiment of the present invention.

FIG. 24 is an explanatory view showing manufacturing of the intermediate formed article 10-7 and the press-formed article 30 by using the press-forming apparatus 20-3 according to this embodiment.

(a) is a perspective view showing a blank 10-8 picked up before forming the stepped portions 16-1, 16-2 which become the outward flanges. (b) is a perspective view showing the blank 10-8 when the stepped portions 16-1, 16-2 are being formed. (c) is a perspective view showing an intermediate formed article 10-7 after forming the stepped portions 16-1, 16-2. (d) is a perspective view of the press-formed article 30.

Figure 25:
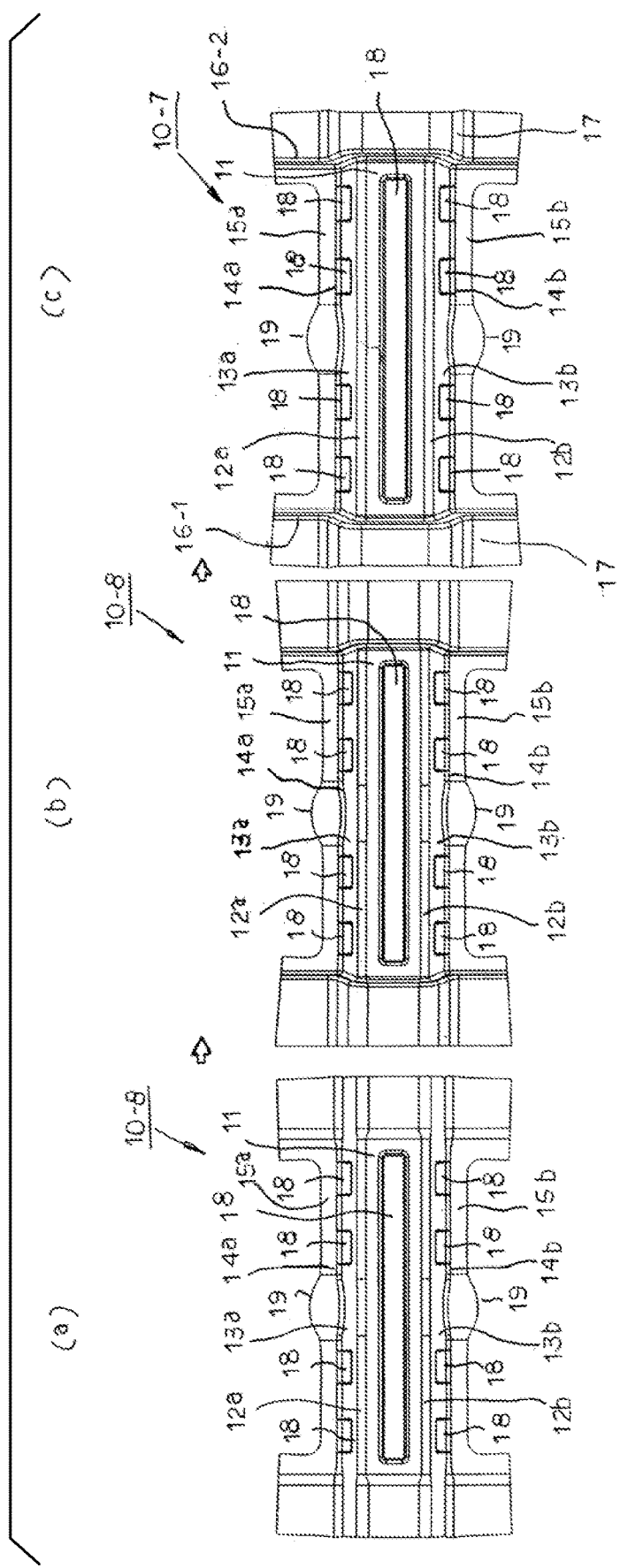
FIG. 25 is an explanatory view showing manufacturing of the intermediate formed article and the press-formed article by using the press-forming apparatus according to an embodiment of the present invention.

FIG. 25 is an explanatory view showing manufacturing of an intermediate formed article 10-7 and a press-formed article 30 by using the press-forming apparatus 20-3 according to this embodiment.

(a) is a top view showing a blank 10-8 picked up before forming the stepped portions 16-1, 16-2 which become the outward flanges.

(b) is a top view showing the blank 10-8 when the stepped portions 16-1, 16-2 are being formed.

(c) is a top view showing the intermediate formed article 10-7 after forming the stepped portions 16-1, 16-2.

Figure 26:
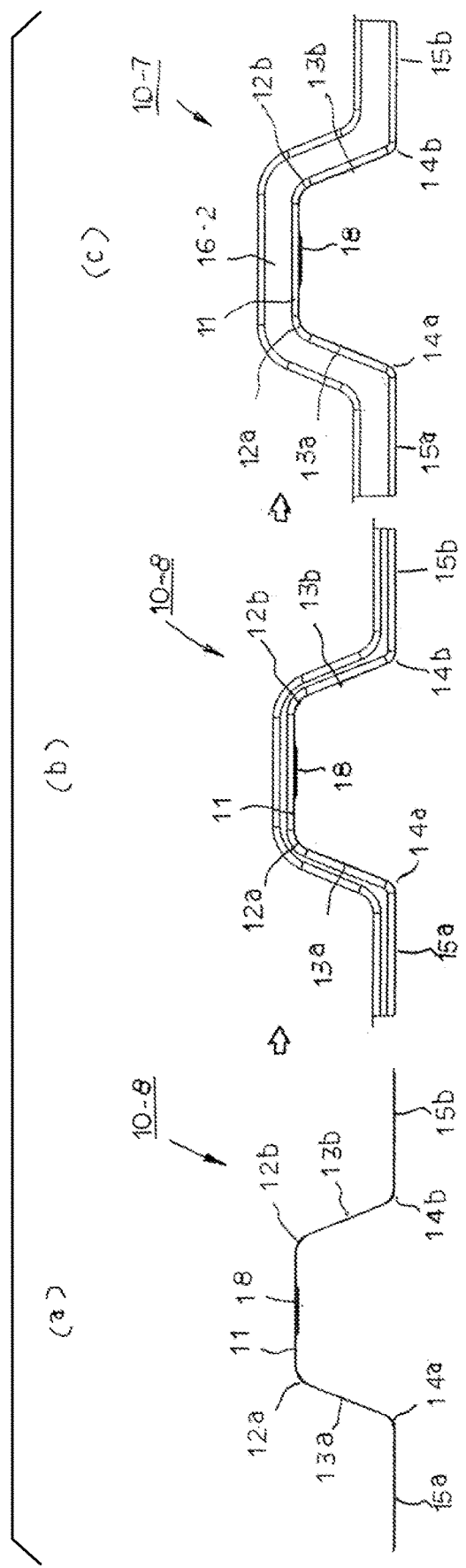
FIG. 26 is an explanatory view showing manufacturing of the intermediate formed article and the press-formed article by using the press-forming apparatus according to an embodiment of the present invention.

FIG. 26 is an explanatory view showing manufacturing of an intermediate formed article 10-7 and a press-formed article 30 by using the press-forming apparatus 20-3 according to this embodiment.

(a) is a front view showing a blank 10-8 picked up before forming the stepped portions 16-1, 16-2 which become the outward flanges.

(b) is a front view showing the blank 10-8 when the stepped portions 16-1, 16-2 are being formed.

(c) is a front view showing the intermediate formed article 10-7 after forming the stepped portions 16-1, 16-2.

Figure 27:
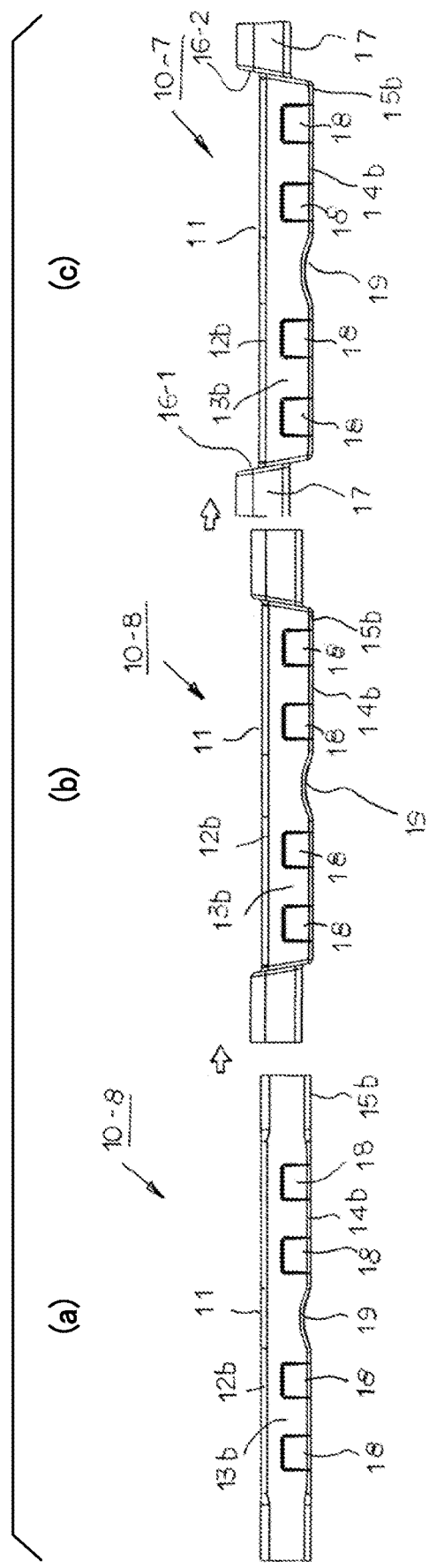
FIG. 27 is an explanatory view showing manufacturing of the intermediate formed article and the press-formed article by using the press-forming apparatus according to an embodiment of the present invention.
Figure 28A:
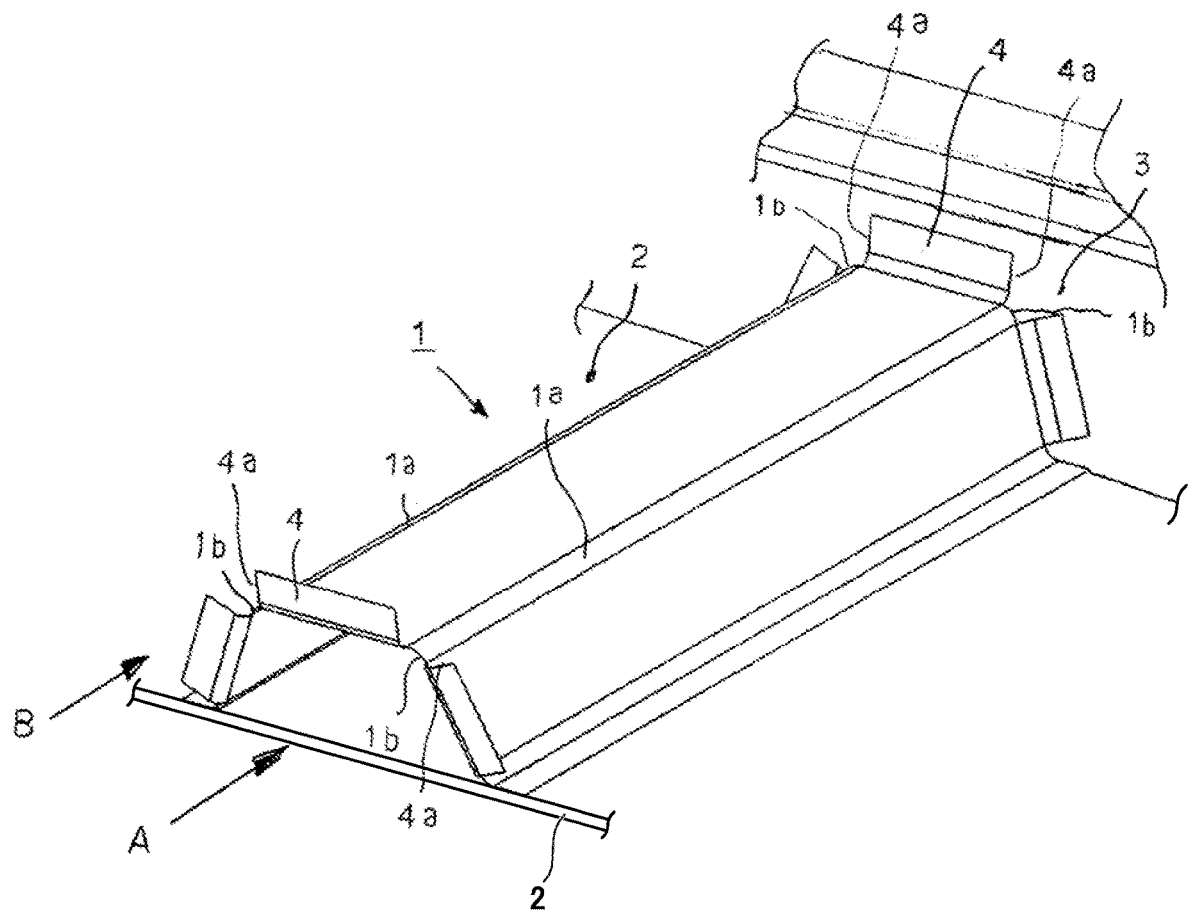
FIG. 28A is a perspective view showing a floor cross member, which is a representative example of the cross member joined to another member by using the outward flange formed on the both ends in the longitudinal direction as the joint margin.
Figure 28B:
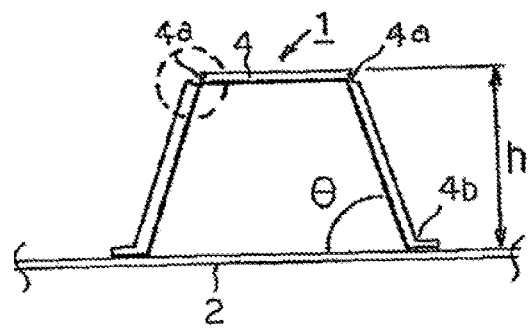
FIG. 28B is an A-arrow view of FIG. 28A.
Figure 28C:
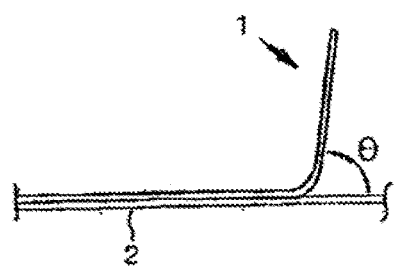
FIG. 28C is a B-arrow view of FIG. 28A.
Figure 28D:
FIG. 28D is an explanatory enlarged view showing a round dashed line circle section in FIG. 28B.
Figure 29:
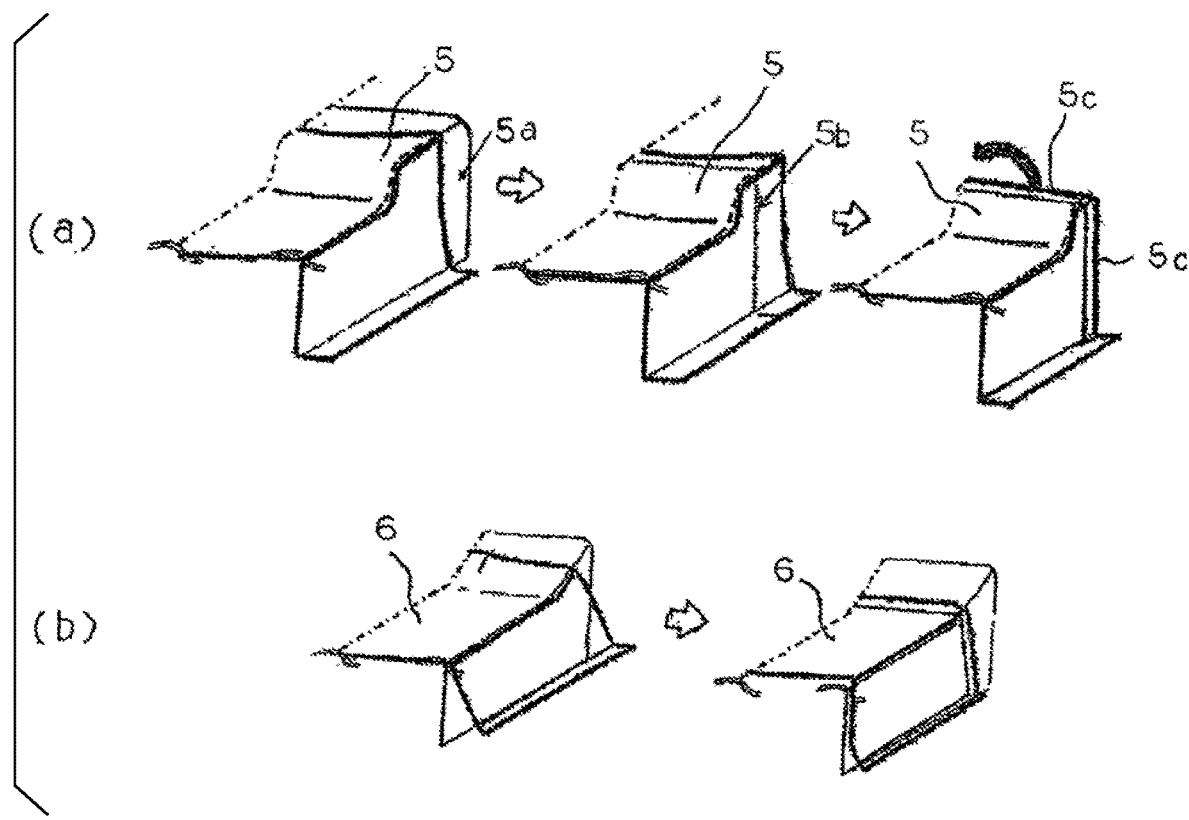
FIG. 29 is an explanatory enlarged view showing an overview of conventional press-forming method of the floor cross member, and particularly enlarging a region of the end portion of the member in the longitudinal direction.

FIG. 27 is an explanatory view showing manufacturing of the intermediate formed article 10-7 and the press-formed article 30 by using the press-forming apparatus 20-3 according to this embodiment.

(a) is a side view showing the blank 10-8 picked up before forming the stepped portions 16-1, 16-2 which become the outward flanges.

(b) is a side view showing the blank 10-8 when the stepped portions 16-1, 16-2 are being formed.

(c) is a side view showing the intermediate formed article 10-7 after forming the stepped portions 16-1, 16-2.

The embodiment 4 is basically similar to the embodiment 1, but differs in that a recessed portion 18 is formed on a top sheet portion 11 and sidewalls 13a, 13b of the pre-formed blank 10-8, and an upward protruding portion 19 is formed on the flanges 15a, 15b, whereby the press-formed article 30 is formed with the recessed portion 18 at the top sheet portion 11 and the sidewalls 13a, 13b, and the upward protruding portion 19 at the flanges 15a, 15b.

Specific examples of the present invention have been explained above based on various embodiments and modifications, but the present invention should not be only limited to these exemplary embodiments. The present invention includes various modifications of the above specific examples.

In the above explanation, as an example, a steel sheet is used as a blank (sheet material). However, the blank may be a plated steel sheet such as a galvanized steel sheet or a galvannealed steel sheet, or may be a metallic sheet such as an aluminum sheet or a titanium steel sheet, or a glass fiber strengthen resin sheet such as FRP or FRTP, or a composite sheet thereof.

In the above explanation, the press-formed article has a pair of outward flanges as an example. However, the press-formed article may be formed with only one outward flange.

In addition, in the above explanation, the press-formed article has a cross section including a pair of convex ridge line portions, a pair of sidewalls, a pair of concaved ridge line portions, and a pair of flanges, as an example. However, the press-formed article may have a half-hat type cross section including respectively one of the convex ridge line portion, the sidewall, the concaved ridge line portion, and the flange. In addition, the press-formed article having the half-hat type cross section may be formed with only one outward flange.

In the above explained press-formed article, as an example, an angle formed by the plane direction of the stepped portion or the outward flange and the plane direction of the top sheet portion is larger than 90 degrees. However, the angle may be not larger than 90 degrees.

EXAMPLES

Figure 30:
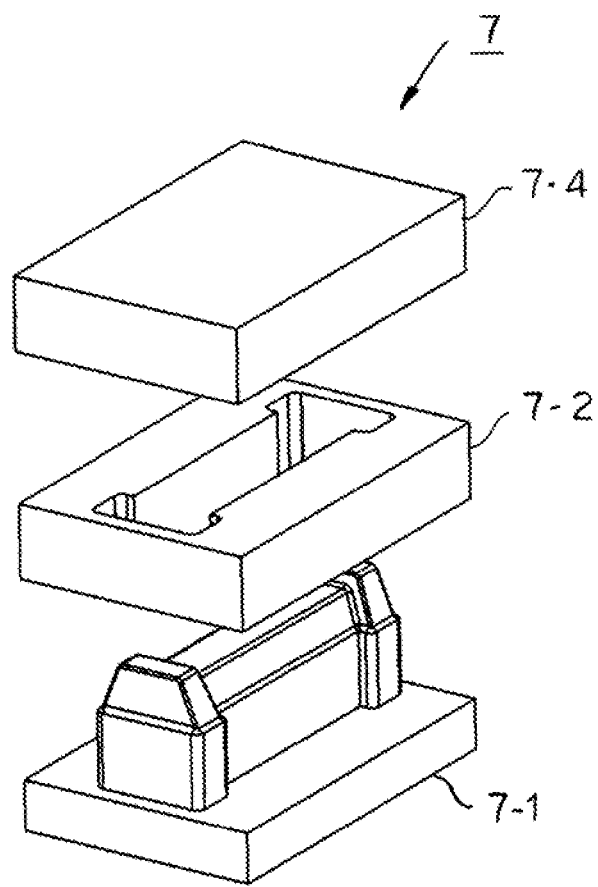
FIG. 30 is a perspective view showing a press-forming apparatus which performs a press forming by drawing.
Figure 31:
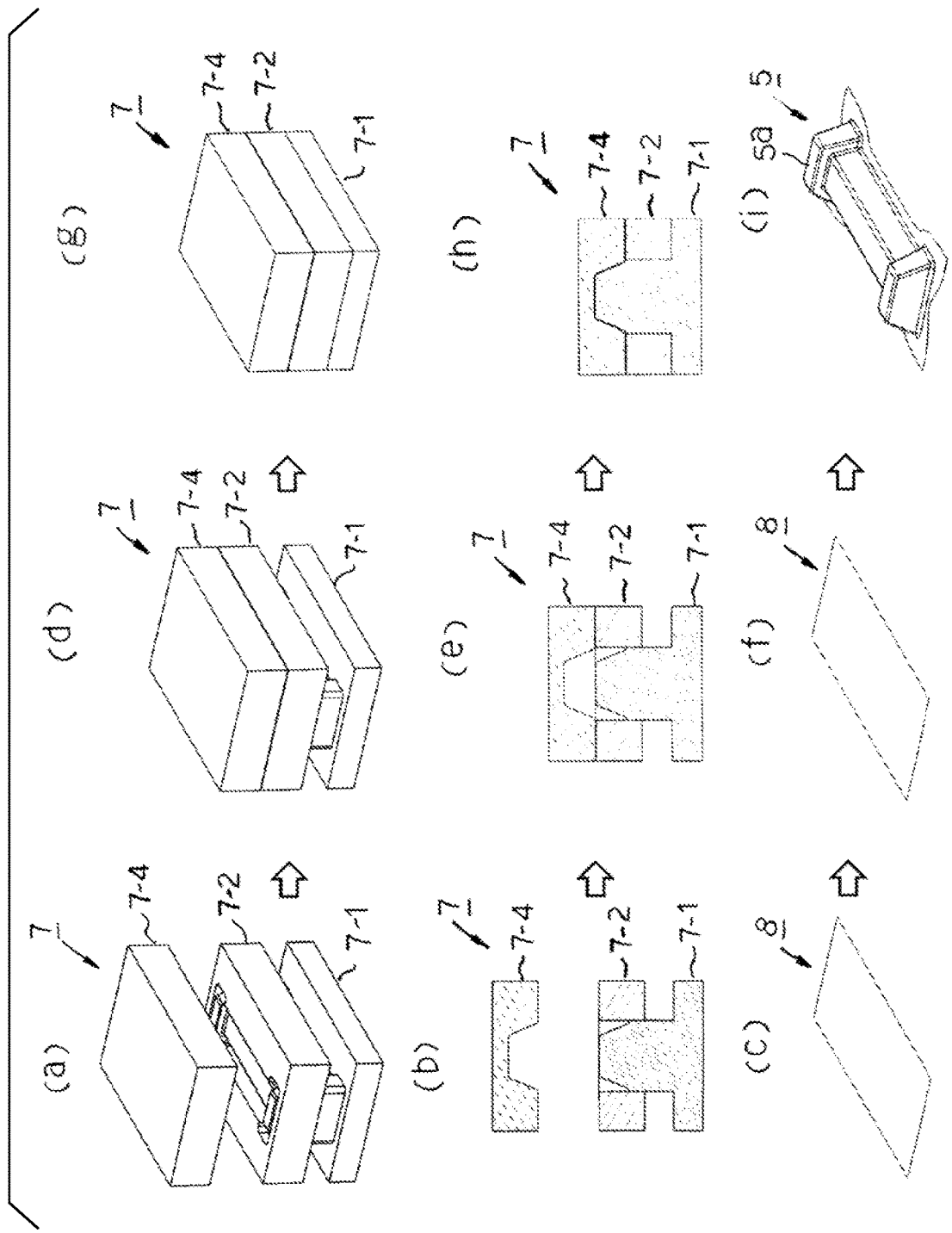
FIG. 31 includes (a) to (i) where (a) is a perspective view showing a press-forming apparatus before forming, (b) is a cross sectional view showing the press-forming apparatus before forming, (c) is a perspective view showing a blank picked up before forming, (d) is a perspective view showing the press-forming apparatus during forming, (e) is a cross sectional view of the press-forming apparatus during forming, (f) is a perspective view showing a blank picked up during forming, (g) is a perspective view showing the press-forming apparatus after forming, (h) is a cross sectional view showing the press-forming apparatus after forming, and (i) is a perspective view showing a blank picked up after forming.

From press-formed bodies 10-2 having a contour as shown in FIG. 4(b), press-formed articles 10 having a contour as shown in FIG. 1 are manufactured. As comparative examples, a press-forming apparatus (manufacturing device 7) as shown in FIG. 30 is used for performing draw forming. As examples of the present invention, a press-forming apparatus 20 as shown in FIG. 3 is used for performing shearing forming.

Table 1 collectively shows the tensile strength TS of the press-formed body 10-2, the sidewall angle θ as shown in FIG. 3, and the evaluation result of the formability. It should be noted that in the "formability evaluation", GOOD indicates that the forming is successfully performed without generation a crack, and BAD indicates that the forming is unsuccessfully performed due to the generation of a crack.

TABLE 1

|  | Comparative examples | | | | | | Examples of the present invention | | | | | |
|---|---|---|---|---|---|---|---|---|---|---|---|---|
| TS (MPa) | 590 | 780 | 980 | 1180 | 1310 | 1410 | 590 | 780 | 980 | 1180 | 1310 | 1410 |
| Method | Draw forming | | | | | | Shearing forming | | | | | |
| Sidewall angle θ (°) |  | 112.5 | | | 135 | |  | 112.5 | | | 135 | |
| Evaluation of the formability | BAD | BAD | BAD | BAD | BAD | BAD | GOOD | GOOD | GOOD | GOOD | GOOD | GOOD |

As shown in FIG. 1, in the comparative examples, if the tensile strength of the press-formed body 10-2 exceeds 440 MPa, a crack was generated at a portion where the outward flanges 16-1, 16-2 and the convex ridge line portions 12a, 12b are met, and therefore failed to manufacture the press-formed article 10 having the outward flanges 16-1, 16-2. On the other hand, in the examples of the present invention, even if the tensile strength of the press-formed body 10-2 exceeds 590 MPa, no crack was generated at the portion where the outward flanges 16-1, 16-2 and the convex ridge line portions 12a, 12b are met, and the desired press-formed article 10 was successfully manufactured.

INDUSTRIAL APPLICABILITY

According to the present invention, without providing a cutout in the outward flange, it is possible to provide a press-formed article such as a floor cross member having a cross section including the top sheet portion, the convex ridge line portion continuing to the top sheet portion, a sidewall continuing to the convex ridge line portion, a concaved ridge line portion continuing to the sidewall, and a flange continuing to the concaved ridge line portion, and having an outward flange at least continuing from the top sheet portion to the flange at one or both of the two end portions in the longitudinal direction, and further provide a press-forming method and a press-forming apparatus for manufacturing the press-formed article.

EXPLANATION FOR REFERENCE SYMBOLS

10 Press-formed article
11 Top sheet portion
12a, 12b Convex ridge line portion
13a, 13b Sidewall
14a, 14b Concaved ridge line portion
15a, 15b Flange
16a, 16b Outward flange

The invention claimed is:
1. A press-forming method comprising:
providing a workpiece as a press-formed body having a top sheet portion, a sidewall continuing from the top sheet portion via a convex ridge line portion, and a flange continuing from the sidewall via a concaved ridge line portion; and
forming, by shearing deformation, a stepped portion continuing from all of the top sheet portion, the sidewall, and the flange, the stepped portion having a top sheet portion, a sidewall continuing from the top sheet portion via a convex ridge line portion, and a flange continuing from the sidewall via a concaved ridge line portion,
wherein in the shearing deforming step,
a first part in the workpiece is restricted by a first punch and a first die,
a second part in the workpiece is restricted by a second punch and a second die, the first part and the second part in the workpiece being divided by a portion to be formed into the stepped portion, and
the stepped portion is formed by relatively moving a set of the first punch and the first die, and a set of the second punch and the second die in an oblique direction with respect to the top sheet portion, in a state where the workpiece is continuously restricted.

2. A press-forming method comprising:
providing a workpiece as a press-formed body having a top sheet portion, a sidewall continuing from the top sheet portion via a convex ridge line portion, and a flange continuing from the sidewall via a concaved ridge line portion; and
forming, by shearing deformation, a stepped portion continuing from all of the top sheet portion, the sidewall, and the flange, the stepped portion having a top sheet portion, a sidewall continuing from the top sheet portion via a convex ridge line portion, and a flange continuing from the sidewall via a concaved ridge line portion, the press-forming method further comprising:

a removing step in which an unnecessary portion near the stepped portion is removed after the shearing deforming step, thereby forming an outward flange continuing from an edge portion of the top sheet portion to an edge portion of the flange, via an edge portion of the convex ridge line portion, an edge portion of the sidewall, and an edge portion of the concaved ridge line portion, wherein in the shearing deforming step, a first part in the workpiece is restricted by a first punch and a first die, a second part in the workpiece is restricted by a second punch and a second die, the first part and the second part in the workpiece being divided by a portion to be formed into the stepped portion, and the stepped portion is formed by relatively moving a set of the first punch and the first die, and a set of the second punch and the second die in an oblique direction with respect to the top sheet portion, in a state where the workpiece is continuously restricted.

3. The press-forming method according to claim 1 or 2, wherein an angle formed between the oblique direction and an extending direction of the top sheet portion in the cross section is not less than 20 degrees, an angle formed between the oblique direction and an extending direction of the sidewall in the cross section is not less than 20 degrees, and an angle formed between the oblique direction and an extending direction of the flange in the cross section is not less than 20 degrees.

\* \* \* \* \*